United States Patent
Sheng et al.

(10) Patent No.: US 12,020,110 B2
(45) Date of Patent: Jun. 25, 2024

(54) TAG DEVICE IN WIRELESS COMMUNICATION SYSTEM, ELECTRONIC DEVICE, COMMUNICATION METHOD, AND STORAGE MEDIUM

(71) Applicant: Sony Group Corporation, Tokyo (JP)

(72) Inventors: Bin Sheng, Jiangsu (CN); Wenbo Zhang, Beijing (CN); Pingping Xu, Jiangsu (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/145,021

(22) Filed: Dec. 22, 2022

(65) Prior Publication Data

US 2023/0130855 A1     Apr. 27, 2023

Related U.S. Application Data

(63) Continuation of application No. 17/258,751, filed as application No. PCT/CN2019/100943 on Aug. 16, 2019, now Pat. No. 11,586,836.

(30) Foreign Application Priority Data

Aug. 24, 2018  (CN) .......................... 201810973227.2

(51) Int. Cl.
  *G06K 7/10*    (2006.01)
  *G06N 20/00*   (2019.01)
(52) U.S. Cl.
  CPC ......... *G06K 7/10366* (2013.01); *G06N 20/00* (2019.01)
(58) Field of Classification Search
  CPC ........ G06K 7/10366; G06K 7/00; G06K 7/08; G06K 7/081; G06N 20/00
  (Continued)

(56) References Cited

U.S. PATENT DOCUMENTS

2003/0067901 A1   4/2003   Schein et al.
2006/0187044 A1   8/2006   Fabian
(Continued)

FOREIGN PATENT DOCUMENTS

CN    1567869 A     1/2005
CN  101460899 A     6/2009
(Continued)

OTHER PUBLICATIONS

International Search Report and Written Opinion dated Oct. 28, 2019, received for PCT Application PCT/CN2019/100943, Filed on Aug. 16, 2019, 9 pages.

*Primary Examiner* — Edwyn Labaze
(74) *Attorney, Agent, or Firm* — XSENSUS LLP

(57) ABSTRACT

A method for estimating channel parameters includes: sending a paging signal for identifying the tag device; sending training sequence information, receiving first training sequence feedback information during a non-working period of the tag device, receiving, during a working period of the tag device, second training sequence feedback information modulated by the tag device, and estimating the channel parameters of the tag device according to the training sequence feedback information and the second training sequence feedback information. The tag device having at least one antenna of the present disclosure can modulate carrier signals to transmit information, has advantages such as a fast transmission rate, a large amount of transmission data and a strong anti-interference capability, and can adapt to different application scenarios.

18 Claims, 18 Drawing Sheets

(58) Field of Classification Search
USPC .......................................... 235/451, 439, 435
See application file for complete search history.

(56) References Cited

U.S. PATENT DOCUMENTS

| | | | |
|---|---|---|---|
| 2008/0048833 A1 | 2/2008 | Oliver | |
| 2010/0304741 A1* | 12/2010 | Gogic | H04W 48/16 |
| | | | 455/434 |
| 2011/0110337 A1* | 5/2011 | Grant | H04L 5/0055 |
| | | | 370/335 |
| 2014/0160957 A1 | 6/2014 | Zheng et al. | |
| 2016/0055732 A1 | 2/2016 | Howard | |
| 2017/0318557 A1 | 11/2017 | Chapelot et al. | |
| 2018/0049129 A1 | 2/2018 | Li | |
| 2018/0332549 A1* | 11/2018 | Bhattad | H04W 56/001 |

FOREIGN PATENT DOCUMENTS

| | | |
|---|---|---|
| CN | 105303137 A | 2/2016 |
| CN | 106452780 A | 2/2017 |
| CN | 106506426 A | 3/2017 |
| CN | 106549692 A | 3/2017 |
| EP | 1339015 A1 | 8/2003 |
| KR | 10-2021-0107654 A | 9/2021 |
| WO | 2017/046143 A1 | 3/2017 |

\* cited by examiner

TAG DEVICE IN WIRELESS COMMUNICATION SYSTEM, ELECTRONIC DEVICE, COMMUNICATION METHOD, AND STORAGE MEDIUM

CROSS-REFERENCE TO RELATED APPLICATIONS

The present application is a continuation of U.S. application Ser. No. 17/258,751, filed Jan. 8, 2021, which is based on PCT filing PCT/CN2019/100943, filed Aug. 16, 2019, which claims priority to CN 201810973227.2, filed Aug. 24, 2018, the entire contents of each are incorporated herein by reference.

FIELD

The present disclosure relates to the technical field of wireless communication, and in particular to a tag device and an electronic device in a wireless communication system, a method of performing wireless communication in a wireless communication system, and a computer readable storage medium.

BACKGROUND

The Internet of Things (IoT) is an information carrier based on the Internet and the conventional telecommunication network, which enables all ordinary things that may perform function independently to form an interconnected and intercommunicated network. The Internet of Things is generally a wireless network. Since devices around each person may reach 1,000 to 5,000, the Internet of Things may contain 500 to 1,000 mega things. With the Internet of Things, each person may use an electronic tag such as a radio frequency tag to connect real things to the Internet, such that specific locations of the real things may be found through the Internet of Things. With the Internet of Things, a centralized management and control to a machine, a device, and a person may be performed by using a central computer, a home device and a vehicle may also be remotely controlled, as well as a search for locations is performed and an article is prevented from being stolen and so on, which is similar to an automated control system. In addition, data of these small things is collected to gather into big data finally, including a significant change to the society, for example, redesigning a road to reduce a car accident, urban renewal, disaster prediction and crime prevention, epidemic control and so on, thereby achieving an interconnection between things and things. The Internet of Things digitizes the real world and has a wide range of applications. The Internet of Things gathers scattered information and integrates digital information between things and things. The Internet of Things may be applied in the fields of transportation and logistics, industrial manufacturing, health and medical, smart environment (home, office, factory), person and society and so on, and has a broad application prospect.

A radio frequency tag is a physical carrier for electronic product code (EPC). The radio frequency tag is attached to a trackable article, and may be circulated globally, identified, read and written. The radio frequency tag may include a sensor circuit configured to sense the to-be-detected information and store the detected information in the circuit of the tag. RFID (Radio Frequency Identification) technique, as a key technique for constructing the Internet of Things (IoT), has attracted attention in recent years. RFID technique is an automatic identification technique, and currently, is mainly applied in ID card and access control, supply chain and inventory tracking, vehicle toll, anti-theft, production control, asset management and so on.

A technical solution related to tag communication is provided according to the present disclosure.

SUMMARY

This section provides a general summary of the present disclosure, rather than a comprehensive disclosure of a full scope or all features of the present disclosure.

An object of the present disclosure is to provide a tag device and an electronic device in a wireless communication system, a method of performing wireless communication in a wireless communication system, and a computer readable storage medium.

According to one aspect of the present disclosure, a method of estimating channel parameters of a tag device is provided. The method includes: sending a paging signal identifying the tag device; sending training sequence information, receiving first training sequence feedback information during a non-working period of the tag device; receiving second training sequence feedback information modulated by the tag device during a working period of the tag device; and estimating the channel parameters of the tag device according to the first training sequence feedback information and the second training sequence feedback information.

According to another aspect of the present disclosure, a method of communicating with an electronic device is provided. The method includes: detecting a paging signal from the electronic device in a working state; modulating other signals received from the electronic device based on identification of the paging signal; and sending the modulated other signals to the electronic device.

According to another aspect of the present disclosure, an electronic device is provided. The electronic device includes: at least one antenna; and one or more processing circuits configured to: send a paging signal identifying the tag device; send training sequence information, receive first training sequence feedback information during a non-working period of the tag device; receive second training sequence feedback information modulated by the tag device during a working period of the tag device; and estimate channel parameters of the tag device according to the first training sequence feedback information and the second training sequence feedback information.

According to another aspect of the present disclosure, a tag device is provided. The tag device includes at least one antenna, and one or more processing circuits configured to: detect a paging signal from an electronic device in a working state; modulate other signals received from the electronic device based on identification of the paging signal; and send the modulated other signals to the electronic device.

According to another aspect of the present disclosure, a computer readable storage medium is provided. The computer readable storage medium includes executable computer instructions, which, when executed by a computer, cause the computer to execute the method according to the present disclosure.

With the tag device, the electronic device, the wireless communication method and the storage medium according to the present disclosure, carrier signals may be modulated by the tag device having at least one antenna to transmit information. The present disclosure has advantages such as a fast transmission rate, a large amount of transmission data and a strong anti-interference capability, and adapts to various application scenarios.

Further applicable field will become apparent from the description provided herein. The description and specific examples in this summary are for illustrative purposes only, and are not intended to limit the scope of the present disclosure.

BRIEF DESCRIPTION OF THE DRAWINGS

The drawings described herein are only used for illustrating the preferred embodiments, rather than all of the possible embodiments, and are not intended to limit the scope of the present disclosure. In the drawings.

Figure 1:
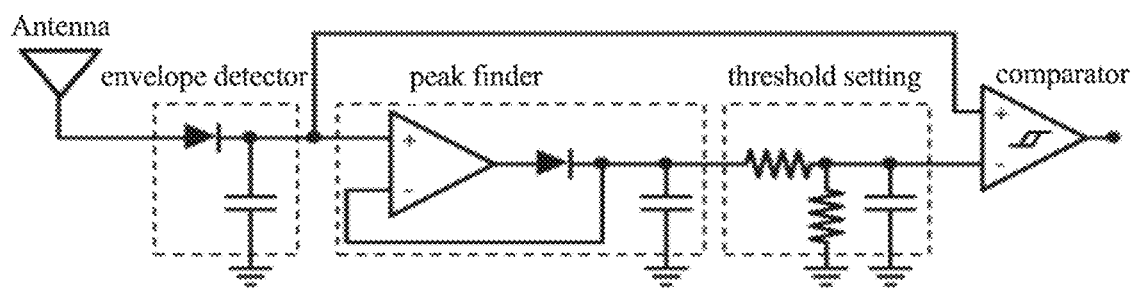
FIG. 1 is a structural diagram showing an exemplary energy detection circuit in a tag according to an embodiment of the present disclosure.

Although the present disclosure is susceptible to various modifications and alternatives, the specific embodiments thereof have been shown in the drawings as examples and are described in detail herein. Whereas it should be understood that the description of the specific embodiments herein is not intended to limit the present disclosure to the disclosed specific form. Instead, the present disclosure aims to cover all modifications, equivalents and replacements that fall within the scope of the present disclosure. It should be noted that corresponding reference numerals indicate corresponding components throughout the drawings.

DETAILED DESCRIPTION OF EMBODIMENTS

Examples of the present disclosure are fully described with reference to the drawings. The following description is merely exemplary, and is not intended to limit the present disclosure, application, or use.

The exemplary embodiments are provided such that the present disclosure may become thorough and will convey the scope of the present disclosure to those skilled in the art. Examples of numerous specific details such as specific components, apparatuses, and methods are set forth to provide a thorough understanding of the embodiments of the present disclosure. It will be apparent to those skilled in the art that the exemplary embodiments may be implemented in many different forms without using specific details, none of which should be construed as limiting the scope of the present disclosure. In some exemplary embodiments, well-known processes, well-known structures, and well-known technologies are not described in detail.

A UE (User Equipment) involved in the present disclosure includes, but is not limited to, a terminal having a wireless communication function, such as a mobile terminal, a computer, an in-vehicle device, and so on. Further, depending on the described functions, the UE involved in the present disclosure may also be the UE itself or components in the UE such as a chip. In addition, similarly, a base station involved in the present disclosure may be an eNB (evolution Node Base Station), a gNB (a base station in a fifth generation communications system), or a component such as a chip in the eNB or gNB, for example. A tag involved in the present disclosure may be a tag that communicates in any communication environment, where the communication environment includes but not limited to, a fourth generation communication system environment, a fifth generation communication system environment, and a Wi-Fi communication environment and so on, for example. An uplink and downlink communication modes for the tag involved in the present disclosure may be the same or different.

A conventional excitation signal of RFID is generally specially designed and then used for the tag, such as a 900 MHz sine wave. However, in order to make full use of a radio frequency signal existing in the surrounding environment (such as Wi-Fi signal) as an excitation signal without the need of using a specially designed dedicated signal, environmental backscatter communication technique emerge. Compared with the conventional RFID, since an excitation signal for a tag using environmental scatter communication technique is not specially designed, a communication mode for a tag device involved in the present invention is different from that of RFID and has a higher complexity. However, since the existing radio frequency signal in the surrounding environment may be utilized, an application range for the tag device involved in the present invention is wider than that of the conventional RFID. In addition, a dedicated device for generating an excitation signal is not required.

Furthermore, as the conventional RFID become smaller and more, supplying power to the conventional RFID becomes more difficult. Cables are generally infeasible, and batteries increase weight, volume and cost, and it is impossible to charge/replace a large number of batteries of RFID. Furthermore, since the tag using the environmental backscatter communication technique involved in the present invention utilizes the existing environmental radio frequency RF signal, the tag involved in the present disclosure does not need to use a dedicated power supply infrastructure as the conventional RFID.

Environmental backscatter communication solves the above problems about a tag by using the existing communication environment transmission. The tag itself does not generate radio wave, and transmission of information is implemented by modulating and reflecting the received signal. This technique may enable ubiquitous communication. The number of the tag may reach an unprecedented scale, and communication may be performed between locations which are not accessible previously. Furthermore, with the environmental backscatter communication technique, the existing radio signal is converted into power supply and communication medium, such that the power efficiency is higher than that of the conventional radio communication in several orders of magnitude.

However, in an environment of the environmental backscatter communication, information transmission utilizing tag reflection may also encounter interference problem.

Furthermore, with the development of communication technology and chip technology, the amount of data that tags is able to collect will continue to increase, and the amount of data that needs to be transmitted will increase accordingly. However, the existing environmental backscatter communication system may not satisfy such application scenarios.

In addition to the above problems, the existing environmental backscatter communication system has a problem that a scatter channel may continuously change when the tag is moving. If a channel is in deep fading environment, a signal-to-noise ratio of the received signal may be reduced, resulting in a large number of error codes. In addition, if the environment in which the tag is located changes, the existing channel between the tag and a reader also changes. If it is affected by the deep fading, the system becomes unstable.

According to an embodiment of the present disclosure, a method for communicating with a tag is provided. The method includes: sending a paging signal for the tag; estimating environmental channel parameters by sending and receiving a first signal during a silence period of the tag; estimating tag channel parameters by sending a second signal and receiving the second signal modulated by the tag during a working period of the tag; and communicating with the tag based on the environmental channel parameters and the tag channel parameters.

Figure 2:
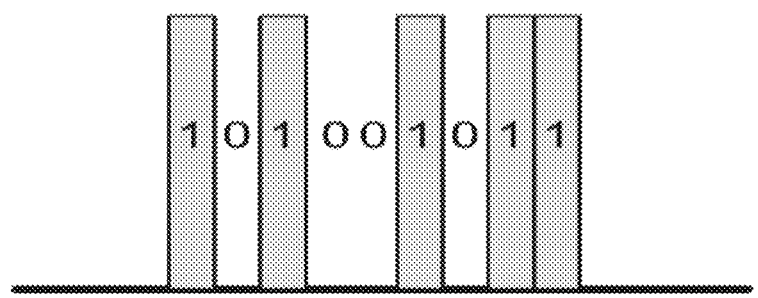
FIG. 2 is a schematic diagram showing a separately designed paging signal according to an embodiment of the present disclosure.

Specifically, for the purpose of example only, a way of identifying the paging signal is described first. An access point device AP (may also be other devices) such as a base station may send a paging signal. The paging signal according to the present disclosure may carry a certain specific identification (ID) signal, which corresponds to a certain specific tag. Multiple different specific identification signals may correspond to a same specific tag, or a certain specific identification signal corresponds to multiple specific tags, or each of multiple specific identification signals corresponds to the multiple specific tags. Here, in the paging signal, the identification signal is represented by energy, such that the tag may read out paging contents by way of energy detection. The reason for using energy to represent the signal is that the tag generally has a simple circuit structure, and thus cannot perform complex digital signal processing operations such as frequency conversion, discrete Fourier transformation (DFT), etc. Therefore, energy detection is preferably used to read out contents of the paging signal. Also, it should be understood that detection of the paging signal is not limited to energy detection. For example, an independently designed paging signal may also be used as shown in FIG. 2, which will be described in detail below. A method of detecting a paging signal by a tag only having a simple circuit structure is described above for the purpose of illustration.

FIG. 1 shows an exemplary energy detection circuit in a tag according to an embodiment of the present disclosure. As shown in FIG. 1, a detection circuit of the tag includes an antenna, a wave detector, a peak finder, a threshold setting, and a comparator. A detection for a paging signal may be implemented by means of a relatively simple circuit structure as shown in FIG. 1.

FIG. 2 shows a separately designed paging signal according to an embodiment of the present disclosure. As shown in FIG. 2, the paging signal is a pseudo-random sequence including bits 1 and 0. For example, when the bit 1 is transmitted, an access point device AP (may also be other devices) such as a base station send a pulse with a specific period and a specific power. When the bit is 0, the access point device AP (may also be other devices) such as a base station does not send any signal. The sent pseudo-random sequence corresponds to an address of the tag, and different pseudo-random sequences correspond to different tag addresses. In this way, the tag may determine the pseudo-random sequence by detecting the pulse in a detection state, and determines a paging signal corresponding to the pseudo-random sequence that matches with its own address as a paging signal for paging itself, and then, activates subsequent operations based on the matching. Since the paging signal is not a Downlink signal according to the above description, when the tag operates in an environment such as cellular communication system, it is required to change the existing communication standard. For example, transmission of a downlink cellular signal may be interrupted when sending the paging signal so as to avoid interference.

Figure 3:
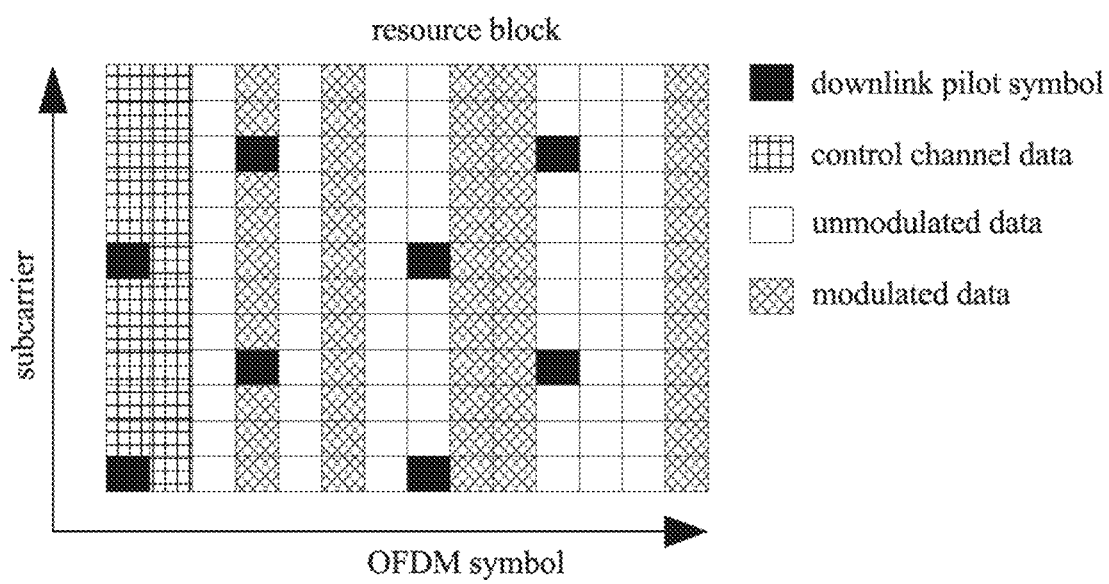
FIG. 3 is a schematic diagram showing a way of implementing a paging signal by changing energy of a cellular signal according to an embodiment of the present disclosure.
Figure 4:
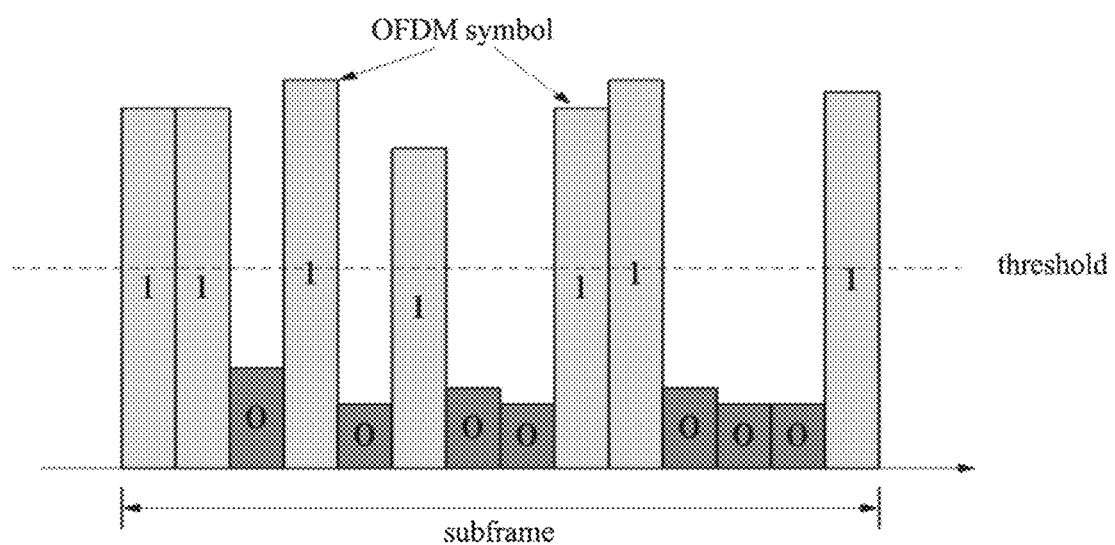
FIG. 4 is a schematic diagram showing a paging signal encoded in a way shown in FIG. 3.

FIG. 3 shows a manner of implementing a paging signal by changing energy of a cellular signal. FIG. 4 shows a paging signal encoded in the way shown in FIG. 3. The paging signal is implemented by changing the energy of the cellular signal. Taking a LTE system as an example, it is assumed in one Resource Block (referred to as RB) that a Physical Downlink Control Channel (referred to as PDCCH) of the control channels and a downlink pilot keep unchanged. In order to change the power of each of OFDM symbols, a way of changing a transmission rate of Physical Downlink Shared Channel (PDSCH) of the data channels or a way of puncturing is adopted. When adopting the way of changing the transmission rate, the data rate is reduced by transmitting data only on some OFDM symbols, as shown in FIG. 3. When adopting the way of puncturing, data on some OFDM symbols are removed, and the resulted loss in performance may be compensated by channel encoding and decoding, such as LDPC or Polar code and so on. A preset threshold is set at a receiver side. When a signal is received, the one above the threshold is determined as 1, and the one below the threshold is determined as 0, and then, one sequence including 1 and 0 as shown in FIG. 4 may be obtained, which corresponds to the corresponding address of the tag. By establishing a one-to-one correspondence between different symbol power changing mode and the address of the tag, the paging signal may be sent without interrupting the transmission of downlink cellular signal. Compared with the scheme shown in FIG. 2, with this scheme, the paging signal may be sent without changing the existing communication standard.

According to an embodiment of the present disclosure, the paging signal includes an ID of a tag device and/or an ID of an electronic device other than the tag.

According to an embodiment of the present disclosure, a method for communicating with the tag is provided. The method includes: sending a paging signal for the tag; estimating environmental channel parameters by sending and receiving a first signal during a silence period of the tag; estimating tag channel parameters by sending a second signal and receiving the second signal modulated by the tag during a working period of the tag; and communicating with the tag based on the environmental channel parameters and the tag channel parameters.

Specifically, the way of estimating the environmental channel parameters is described in detail. The tag needs to keep silent during the time period after the paging signal is detected. In order to calculate a reflection interference only caused by the environment, miscalculation caused by tag-reflected signal needs to be eliminated, and thus the tag is kept silent. Then, a signal source of the access point device AP (may also be other devices) such as the base station sends a signal for estimating environmental channel parameters. The signal may be a pilot sequence, since the pilot sequence is a known signal that is continuously transmitted at a fixed frequency and is usually used in channel estimation and synchronization. As an alternative, a training sequence may also be sent. As is known, the training sequence is a known symbol (which is generally at a header of a frame) at the beginning of the sent data frame, which is used for time and frequency synchronizations and channel estimation at the receiver side. As another alternative, a data signal required by a cellular user may also be sent at this time. Since the above signals are known to a transmitting device, these signals each may be used to estimate channel parameters similarly to the pilot sequence. In the environmental back-scatter communication system, the signal sent by the signal source of the access point device AP (may also be other devices) such as the base station returns back to the signal source of the access point device AP (may also be other devices) such as the base station only after being reflected by the environment. By measuring the environment reflection channel parameters, a self-interference signal formed due to the environment reflection may be estimated. The signal which has been modulated by the tag may be demodulated in the presence of environmental interference only when the self-interference signal has been eliminated.

Figure 5:
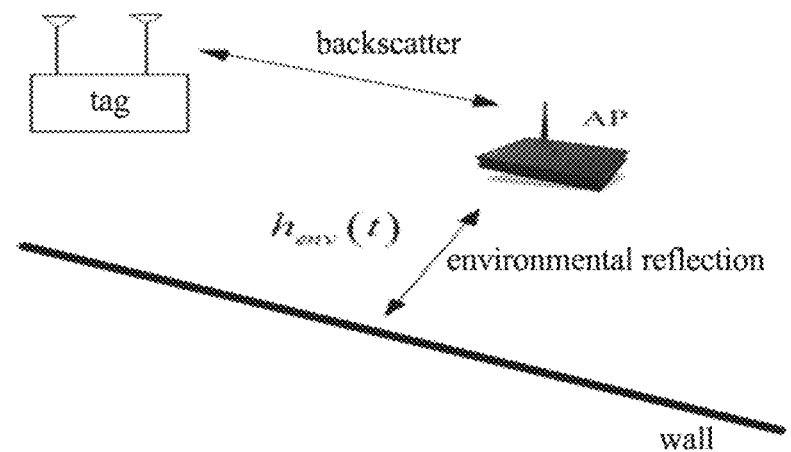
FIG. 5 is a schematic diagram showing that a signal is backscattered by a tag and reflected by the environment according to an embodiment of the present disclosure.

FIG. 5 shows a schematic diagram that a signal is back-scattered by a tag and reflected by the environment. It may be seen from FIG. 5, a signal sent by a signal source AP is not only backscattered by a tag in a working state, but also reflected by an obstacle in the environment such as a wall. Therefore, prior to determining information in the tag in real time, it is necessary to determine tag channel parameters related to reception and reflection of the signal by the tag and environmental channel parameters related to reception and reflection of the signal by the environment. Since the calculation of the environmental channel parameters should be performed in a case that the signal is received and reflected by the environment only, the tag in the environment may be kept in a silent state. However, it should also be considered that there may be other interference sources which are sending or will send signals in the environment. Therefore, before the signal resource AP sends a paging signal, the signal source AP sends a signal for requesting other devices (other than the tag) to keep silent within its coverage, for example in a wired or wireless way, so as to cause other devices (other than the tag) located within its coverage to keep silent to cancel signal transmission, stop signal transmission or suspend signal transmission, such that the signal source AP may receive signals from the tag in the subsequent process. In a cellular network propagation environment, one cell is generally covered by one signal source base station AP. In this case, a process of keeping other devices silent may be omitted. In a case that one cell is covered by multiple signal sources APs, the signal sources APs coordinate to make other APs keep silent until data transmission for the tag is completed. In addition, in the present disclosure, description is made with reference to a cellular signal system is only illustrative rather than restrictive. The present disclosure is not limited to the cellular signal system, and may also be applied to other communication system, such as a wireless television signal system that generates wireless television signal via a television tower, a local area network signal system that generates Wi-Fi signal via a local area network router, or an independent signal system that generates a special signal via an independent signal source, and so on. In these communication systems, when there are multiple APs in a single one coverage area, other APs than the signal source AP are required to keep silent.

If only tags that may reflect signals transmitted by the signal source AP and an obstacle (wall) exist in the environment, the specific way of estimating the environmental channel parameters will be described below in conjunction with FIGS. 5 and 6.

Figure 6:
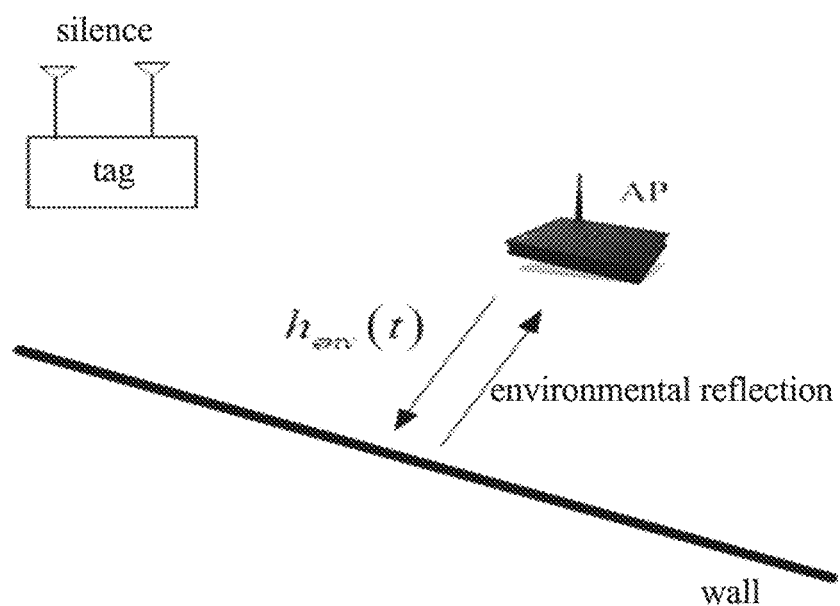
FIG. 6 is a schematic diagram showing an environmental self-interference reflected signal when a tag is in a silent state according to an embodiment of the present disclosure.

FIG. 6 shows a schematic diagram of an environmental self-interference reflected signal when a tag is in a silent state.

It is assumed that a signal source AP sends a signal $x(t)$ (the signal $x(t)$ may include but is not limited to a pilot sequence, a training sequence, a cellular signal as described above). The signal, which is returned back to the signal source AP (also acting as the receiver) after being reflected by the environment (for example, a wall) as shown in FIG. 4, is as follows:

$$y_{env}(t) = \underbrace{x(t) * h_{env}(t)}_{environment} \quad (1)$$

In the formula (1), $h_{env}(t)$ represents environmental channel parameter. Since $x(t)$ is known to the signal source AP, the estimated value of the $h_{env}(t)$ may be calculated based on the received signal and the known $x(t)$ according to the formula (1). $h_{env}(t)$ represents a degree with which the signal sent by a current signal source AP is changed by a channel through which the signal is reflected by the environment, and thus indicates environmental channel parameter for an interference caused by the environment in the current environment.

According to an embodiment of the present disclosure, a method for communicating with a tag is provided. The method includes: sending a paging signal for the tag; estimating environmental channel parameters by sending and receiving a first signal during a silence period of the tag; estimating tag channel parameters by sending a second signal and receiving the second signal modulated by the tag during a working period of the tag; and communicating with the tag based on the environmental channel parameters and the tag channel parameters.

Figure 7:
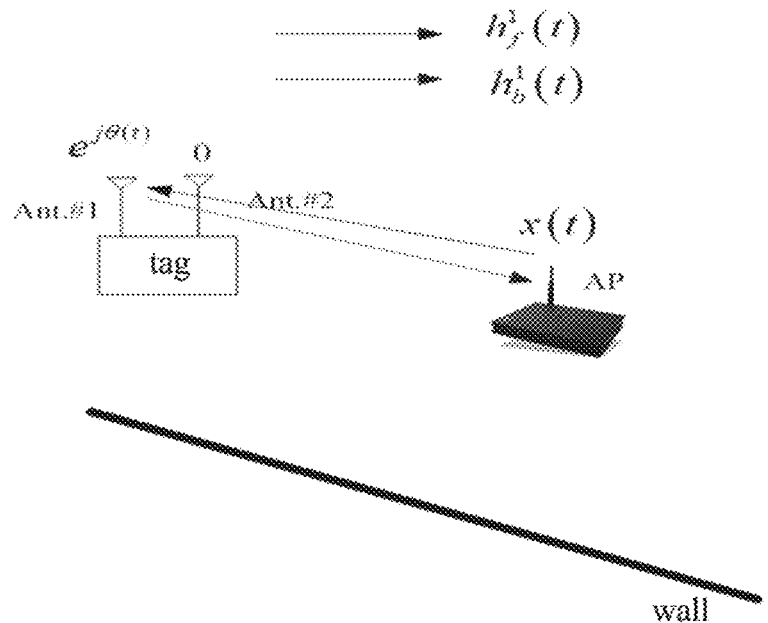
FIG. 7 is a schematic diagram showing a reflected signal when a tag is in a working state according to an embodiment of the present disclosure.

Specifically, the way of estimating the tag channel parameters is described in detail. FIG. 7 shows a schematic diagram of a reflected signal when a tag is in a working state according to an embodiment of the present disclosure.

It is assumed that a signal $x(t)$ is sent by a signal source and reaches antenna 1 of the tag, and the antenna 1 modulates a pilot signal $e^{j\Theta(t)}$ for example. Then the signal that reaches the receiver after being reflected is as follows:

$$y_{back1}(t) = \underbrace{\{[x(t) * h_f^1(t)] \cdot e^{j\Theta(t)}\} * h_b^1(t)}_{backscatter} \quad (2)$$
$$= x(t) * [h_f^1(t) * h_b^1(t)] \cdot e^{j\Theta(t)}$$

In the formula (2), $h_f^1(t)$ represents a forward channel through which the signal $x(t)$ is transmitted from the signal source to the antenna 1 of the tag, and $h_b^1(t)$ represents a backward channel through which the signal is transmitted from the tag to the signal source AP, as shown in FIG. 7. It should be noted that, when estimating channel parameters for a forward channel through which the signal is received by the tag and a backward channel through which the signal is reflected, preset information is used to modulate the signal received via the tag. In the formula (2), $e^{j\Theta(t)}$ is the predetermined information. Obviously the preset information herein is a change amount of phase. Since $x(t)$ and $e^{j\Theta(t)}$ are known in formula (2), the signal source may estimate a back-and-forth channel parameter $h_f^1(t)*h_b^1(t)$ for the antenna 1 of the tag by receiving the signal reflected by the tag. Therefore, a composite channel parameter $h_f^1(t)*h_b^1(t)$ for the antenna 1 may be calculated based on the following formula (3).

$$\tilde{h}_1(t) = x(t) * [h_f^1(t) * h_b^1(t)] \quad (3)$$

According to an embodiment of the present disclosure, a method for communicating with a tag is provided. The method includes: sending a paging signal for the tag; estimating environmental channel parameters by sending and receiving a first signal during a silence period of the tag; estimating tag channel parameters by sending a second signal and receiving the second signal modulated by the tag during a working period of the tag; and communicating with the tag based on the environmental channel parameters and the tag channel parameters.

Figure 8:
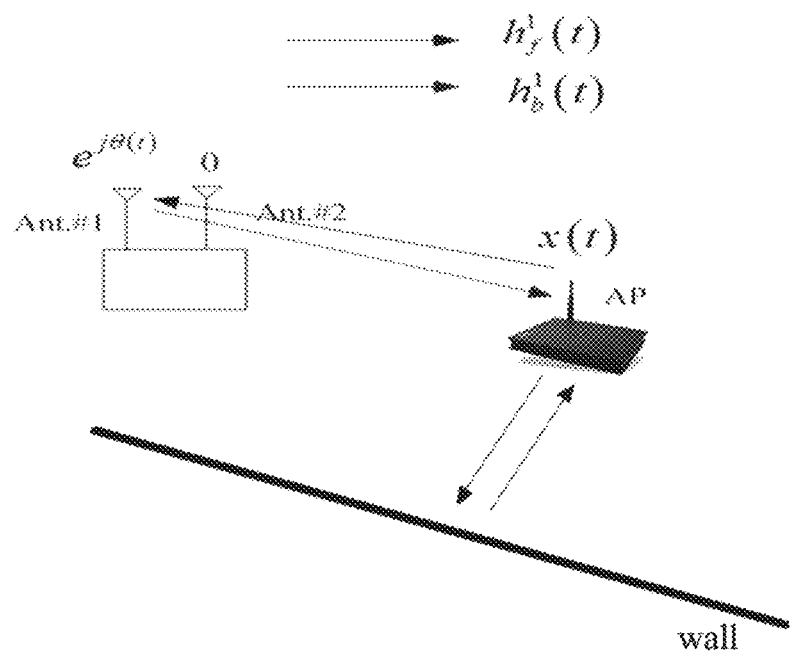
FIG. 8 is a schematic diagram showing that a signal is received, modulated and reflected by one antenna of a tag according to an embodiment of the present disclosure.

Specifically, a way of communicating with the tag based on the environmental channel parameters and the tag channel parameters is described in detail. FIG. 8 shows a schematic diagram that a signal is received, modulated and reflected by one antenna of a tag according to an embodiment of the present disclosure.

First, how the tag uses to-be-sent information to modulate a received signal is described. The tag may modulate a signal by changing a phase or an amplitude of the received signal (excitation signal). With the circuit structure of FIG. 1, a change in the phase of the signal and/or a change in the amplitude of the signal may be implemented, and the change in the phase and/or the change in the amplitude of the signal may be demodulated at a receiver AP, thereby obtaining to-be-transmitted information of the tag. Since the circuit of the tag is simple and energy is limited, a transmission rate for the signal is low, a symbol period is about 500 ns-2000 ns, and a channel delay is about 50 ns-80 ns. Therefore, the tag signal may be regarded as an unknown constant.

It is assumed that a signal source AP sends a signal $x(t)$, and antenna 1 of the tag modulates a data signal $e^{j\Theta(t)}$. Then the signal that reaches the receiver after being reflected is as follows:

$$y_{rx}(t) = \underbrace{x(t) * h_{env}(t)}_{environment} + \underbrace{\{[x(t) * h_f^1(t)] \cdot e^{j\Theta(t)}\} * h_b^1(t)}_{backscatter} \quad (4)$$
$$= y_{env} + \tilde{h}_1(t) \cdot e^{j\Theta(t)}$$

In the formula (4), $y_{env}$ env is a self-interference signal generated by the signal source AP and has been estimated as described above with reference to FIG. 6. Therefore, it may be directly eliminated by means of the formula (4). $\tilde{h}_1(t)$ is a composite channel parameter for the antenna 1 and has been estimated as described above with reference to FIG. 6. Accordingly the unknown $e^{j\Theta(t)}$ may be demodulated. It should be noted that, although the $e^{j\Theta(t)}$ described with reference to FIG. 8 looks like the $e^{j\Theta(t)}$ described with reference to FIG. 7, a difference between them is that: in order to estimate channel parameters of a signal received and reflected by the tag, the $e^{j\Theta(t)}$ described with reference to FIG. 7 is known in advance or preset, while the $e^{j\Theta(t)}$ described with reference to FIG. 8 is modulation information modulated with to-be-sent tag information for example, and thus the $e^{j\Theta(t)}$ described with reference to FIG. 8 is unknown.

In view of the aforementioned problems: with the development of communication technology and chip technology, the amount of data that the tag is capable of collecting continuously increases, and the amount of data that needs to be transmitted increases accordingly. However, the existing environmental backscatter communication system may not satisfy such application scenarios.

Therefore, it is considered to make the tag include multiple antennas to increase the transmission rate, so as to deal with an environmental backscatter communication scenario in which the amount of data increases. Here, An expression for multiple antennas does not limit the number of antennas, and may be, for example, a large-scale antenna array in a 5G NR application scenario. The description is described below only taking an addition of one antenna as an example, and a case of adding more antennas may be similarly inferred, which is not repeated.

In a case that the tag includes another antenna, since the signal is needed to be modulated via the antenna, it is necessary to estimate channel parameters of a channel received and reflected via the antenna. Therefore, similar to the method of detecting channel environment of one antenna of the tag as shown in FIG. 8, in the second time slice different from a time slice in which the first antenna works, antenna 2 of the tag modulates data while antenna 1 of the tag does not modulate signal (i.e. modulating signal 0). At this time, the received signal is represented as follows:

$$y_{back2}(t) = \underbrace{\{[x(t) * h_f^2(t)] \cdot e^{j\theta(t)}\} * h_b^2(t)}_{backscatter} \quad (5)$$
$$= x(t) * [h_f^2(t) * h_b^2(t)] \cdot e^{j\theta(t)}$$

in the formula (5), $h_f^2(t)$ represents a forward channel through which x(t) is transmitted from the signal source AP to the antenna 2 of the tag, and $h_b^2(t)$ represents a backward channel through which the signal is transmitted from the tag to the AP. In the formula (5), since x(t) and $e^{j\theta(t)}$ are known, the AP may estimate a back-and-forth channel parameter $h_f^2(t)*h_b^2(t)$ for the antenna 2 of the tag and take a parameter calculated based on the following formula as a composite channel parameter for the antenna 2.

$$\tilde{h}_2(t) = x(t) * [h_f^2(t) * h_b^2(t)] \quad (6)$$

Figure 9:
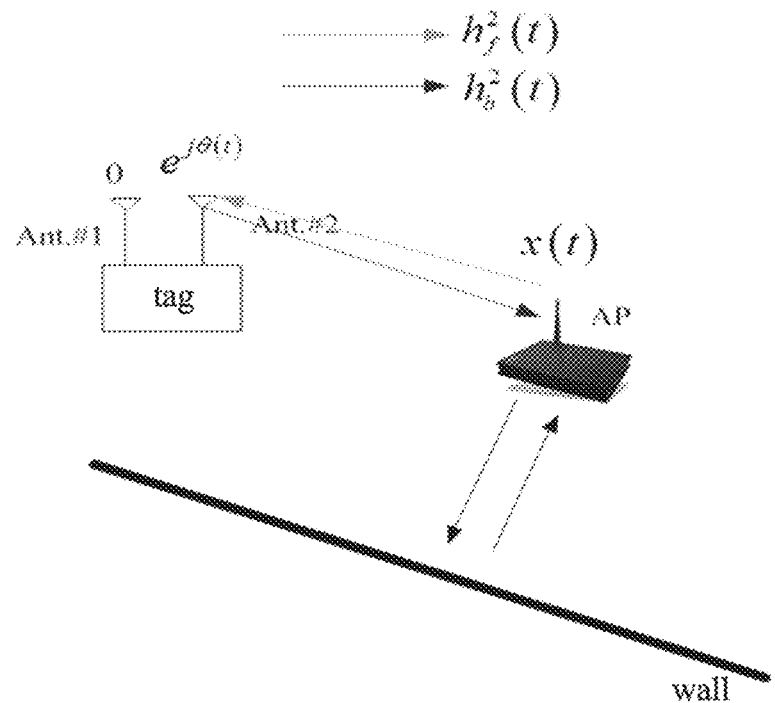
FIG. 9 is a schematic diagram showing that a signal is received, modulated and reflected by another antenna of a tag according to an embodiment of the present disclosure.

FIG. 9 shows a schematic diagram that a signal is received, modulated and reflected by another antenna of a tag according to an embodiment of the present disclosure.

Since FIGS. 8 and 9 respectively show two antennas of the tag operate in the same system, it is assumed that these two antennas operate in a time division multiplexing mode. Therefore, description is made in conjunction with FIGS. 8 and 9. It is assumed that a signal source AP sends a signal x(t), and a period in which the tag modulates the signal is T. In the first $$\frac{T}{2}$$

time period, antenna 1 or the tag modulates data signal $e^{j\theta(t)}$, and antenna 2 modulates "0". Then the signal that reaches the AP after being reflected is as follows:

$$y_{rx}(t) = \underbrace{x(t) * h_{env}(t)}_{environment} + \underbrace{\{[x(t) * h_f^1(t)] \cdot e^{j\theta(t)}\} * h_b^1(t)}_{backscatter} \quad (7)$$
$$= y_{env} + \tilde{h}_1(t) \cdot e^{j\theta(t)}$$

in the formula (7), $y_{env}$ is a self-interference signal generated by the signal source AP and has been estimated as described above with reference to FIG. 6. Therefore it may be directly eliminated. $\tilde{h}_1(t)$ is a composite channel parameter for the antenna 1 and has been estimated as described above with reference to FIG. 7. As such, the unknown $e^{j\theta(t)}$ may be demodulated. It should be noted that, although the $e^{j\theta(t)}$ described with reference to FIGS. 8 and 9 looks like the $e^{j\theta(t)}$ described with reference to FIG. 7, a difference between them is that: in order to estimate channel parameters of a signal received and reflected by the tag, the $e^{j\theta(t)}$ described with reference to FIG. 7 is known in advance or preset, while the $e^{j\theta(t)}$ described with reference FIGS. 8 and 9 is unknown because it is the modulated information which has been modulated by the to-be-sent tag information for example. In the second $$\frac{T}{2}$$

time period, the antenna 2 of the tag modulates the data signal $e^{j\theta(t)}$, and the antenna 1 modulates "0". Then the signal that reaches the receiver after being reflected is as follows:

$$y_{rx}\left(t + \frac{T}{2}\right) = y_{env} + \tilde{h}_2(t) \cdot e^{j\theta(t)} \quad (8)$$

In the formula (8), $y_{env}$ is a self-interference signal generated by the signal source AP, and has been estimated as described above with reference to FIG. 6. Therefore, it may be directly eliminated. $\tilde{h}_2(t)$ is a composite channel parameter for the antenna 2, and may be estimated in the similar way as described with reference to FIGS. 6 and 7.

The system shown in FIGS. 8 and 9 is a multiple input single output system MISO. In this type of system, a tag signal is reflected by more than one antenna, the reflected signal is transmitted through different channels, such that a diversity gain increases, thereby reducing a bit error rate and improving robustness of the system under a state that the environment changes or a moving state.

Corresponding to the multiple input single output system MISO, a single input multiple output system SIMO may be adopted, that is, a case that the signal source AP includes multiple antennas and the tag includes a single antenna. In this system, the signal source AP needs to sequentially send a pilot sequence, a training sequence, or a cellular signal on the multiple antennas to the single antenna of the tag. For example, if the signal source AP includes two antennas, the pilot sequence, the training sequence, or the cellular signal is first sent on the antenna 1, and at this time no signal is sent on the antenna 2. Then, the signal source AP sends the pilot sequence, the training sequence or the cellular signal on the antenna 2, and at this time no signal is sent on the antenna 1.

Figure 10:
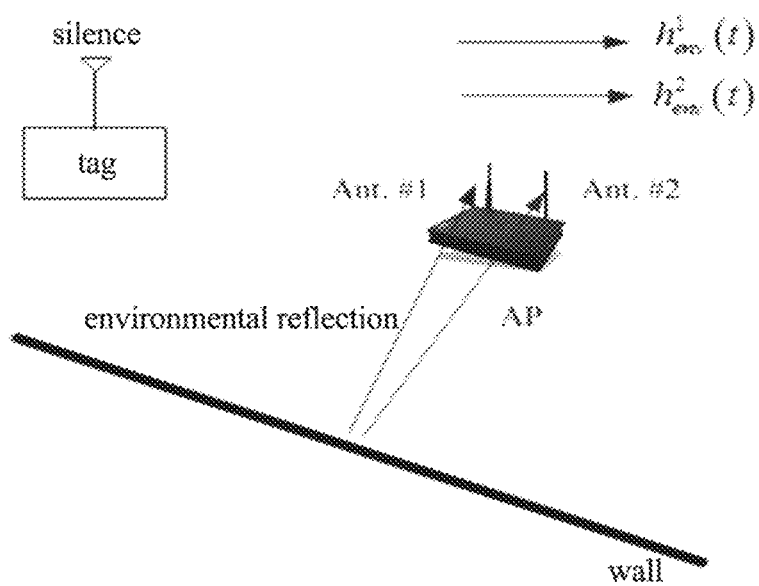
FIG. 10 is a schematic diagram showing a multi-antenna signal reflected due to environmental self-interference when a tag is in a silent state according to an embodiment of the present disclosure.

FIG. 10 shows a schematic diagram of a multi-antenna signal reflected due to environmental self-interference when a tag is in a silent state according to an embodiment of the present disclosure.

Similar to the aforementioned process, first, it is required to estimate environmental channel parameters corresponding to respective antenna of a signal source AP. Assuming that the AP sends a signal x(t), signals that reach the AP after being reflected by a wall as shown in FIG. 10 are respectively as follows:

$$y_{env}^1(t) = \underbrace{x(t) * h_{env}^1(t)}_{environment} \quad (9)$$

-continued $$y_{env}^1(t) = \underbrace{x(t) * h_{env}^1(t)}_{environment} \quad (10)$$

in the formulas (9) and (10), $h_{env}^1(t)$ is a channel parameter for the first antenna, and $h_{env}^2(t)$ is a channel parameter for the second antenna. Since x(t) is known, the estimated values of channel parameters for the two antennas may be obtained.

Figure 11:
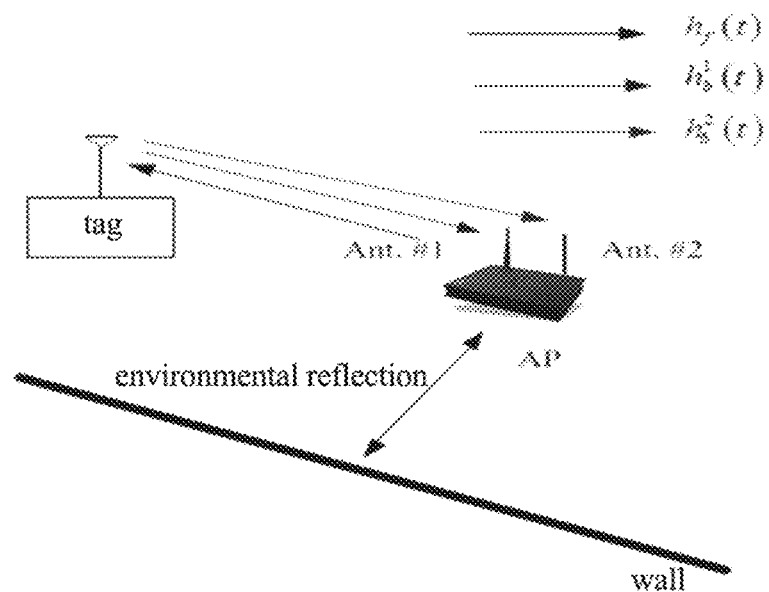
FIG. 11 is a schematic diagram showing that a signal is reflected to multiple antennas when a tag is in a working state according to an embodiment of the present disclosure.

FIG. 11 shows a schematic diagram that a signal is reflected to multiple antennas when a tag is in a working state according to an embodiment of the present disclosure.

It is assumed that a signal source AP sends a signal x(t), and the tag modulates a pilot signal $e^{j\theta(t)}$. The signal that reaches antenna 1 of the AP after being reflected is as follows:

$$y_{rx}^1(t) = \underbrace{x(t) * h_{env}^1(t)}_{environment} + \underbrace{\{[x(t) * h_f(t)] \cdot e^{j\theta(t)}\} * h_b^1(t)}_{backscatter} \quad (11)$$

$$= y_{env}^1 + \tilde{h}_1(t) \cdot e^{j\theta(t)}$$

in the formula (11), $h_f(t)$ represents a forward channel through which x(t) is transmitted from the signal source AP to the tag, and $h_b^1(t)$ represents a backward channel through which the signal is transmitted from the tag to the antenna 1 of the AP, as shown in FIG. 11. In the formula (11), since x(t), $y_{env}^1$, and $e^{j\theta(t)}$ are known, the AP may estimate a back-and-forth channel parameter $h_f(t)*h_b^1(t)$ or the antenna 1 of the AP, and take a parameter calculated based on the following formula as a composite channel parameter for the antenna 1.

$$\tilde{h}_1(t)=x(t)*(t)*[h_f(t)*h_b^1(t)] \quad (12)$$

Similarly, the signal that reaches the antenna 2 of the AP after being reflected is as follows:

$$y_{rx}^2(t) = \underbrace{x(t) * h_{env}^2(t)}_{environment} + \underbrace{\{[x(t) * h_f(t)] \cdot e^{j\theta(t)}\} * h_b^2(t)}_{backscatter} \quad (13)$$

$$= y_{env}^2 + \tilde{h}_2(t) \cdot e^{j\theta(t)}$$

in the formula (13), $h_f(t)$ represents a forward channel through which x(t) is transmitted from the AP to the tag, and $h_b^2(t)$ represents a backward channel through which the signal is transmitted from the tag to the antenna 2 of the AP. In the formula (13), since x(t), $y_{env}^2$, and $e^{j\theta(t)}$ are known, the AP may estimate a back-and-forth channel parameter $h_f(t)*h_b^2(t)$ for the antenna 2 of the AP, and take a parameter calculated based on the following formula as a composite channel parameter for the antenna 2.

$$\tilde{h}_2(t)=x(t)*[h_f(t)*h_b^2(t)] \quad (14)$$

Figure 12:
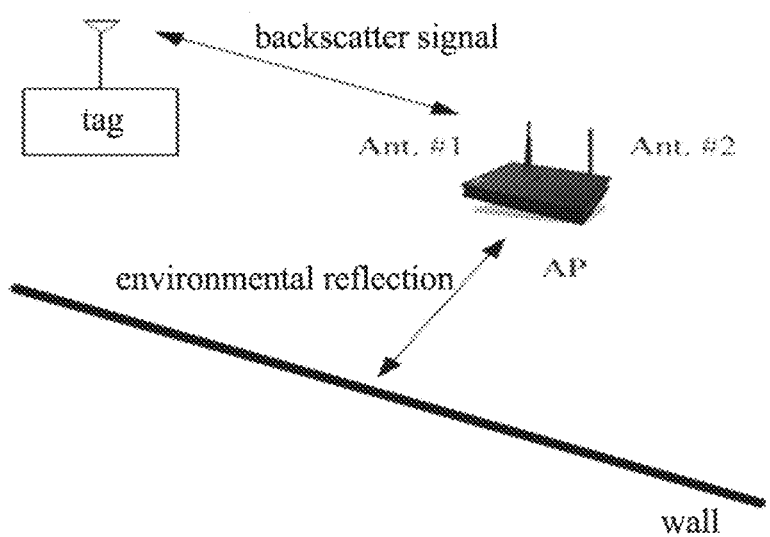
FIG. 12 is a schematic diagram showing that a signal is transmitted and received by two antennas of an AP according to an embodiment of the present disclosure.

FIG. 12 shows a schematic diagram that a signal is transmitted and received by two antennas of an AP according to an embodiment of the present disclosure.

It is assumed that the AP sends a signal x(t), and the tag modulates a data signal $e^{j\theta(t)}$. The signal that reaches antenna 1 of a receiver after being reflected is as follows:

$$y_{rx}^1(t)=y_{env}^1+\tilde{h}_1(t)\cdot e^{j\theta(t)} \quad (15)$$

in the formula (15), $y_{env}^1$ is a self-interference signal generated by antenna 1 of the AP, and has been estimated previously. Therefore, it may be directly eliminated. $h_1(t)$ is a composite channel parameter for the antenna 1 of the AP and has also been estimated previously, and therefore $e^{j\theta(t)}$ may be demodulated. The signal received by antenna 2 of the AP is as follows:

$$y_{rx}^2(t)=y_{env}^2+\tilde{h}_2(t)\cdot e^{j\theta(t)} \quad (16)$$

in the formula (16), $y_{env}^2$ is a self-interference signal generated by the antenna 2 of the AP and has been estimated previously. Therefore, it may be directly eliminated. $\tilde{h}_2(t)$ is a composite channel parameter for the antenna 2 and has also been estimated previously, therefore $e^{j\theta(t)}$ may be demodulated.

Similar to the MISO system, in the SIMO system, the tag signal is received by more than one antenna and is transmitted through different channels, such that a diversity gain increases, thereby reducing a bit error rate and improving robustness of the system under a state that the environment changes or a moving state.

Figure 13:
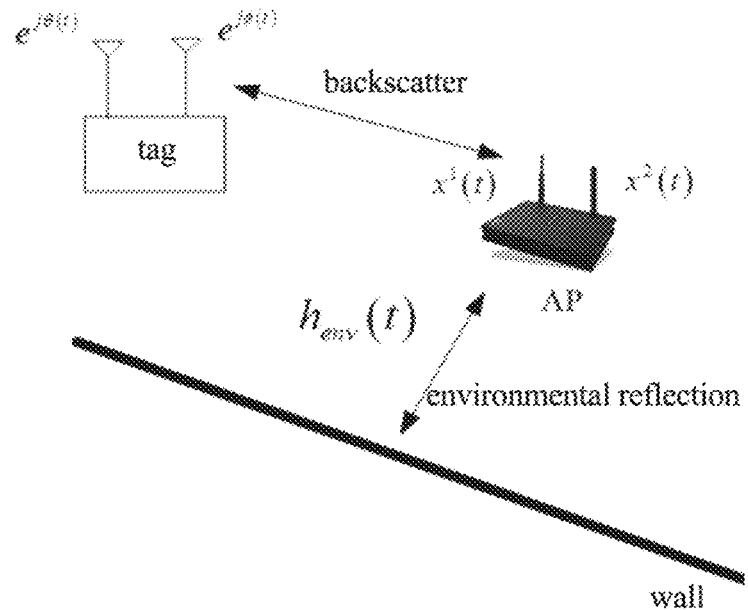
FIG. 13 is a schematic diagram showing that a multiple input multiple output system MIMO includes an AP including two antennas and a tag including two antennas according to an embodiment of the present disclosure.

FIG. 13 shows a schematic diagram that a multiple input multiple output system MIMO includes an AP including two antennas and a tag including two antennas according to an embodiment of the present disclosure.

The SIMO and MISO described above may also be combined to further improve a data transmission capability, that is, an AP in the multiple input multiple output system MIMO system includes multiple antennas and the tag also includes multiple antennas. Environmental channel parameters and tag channel parameters in a case of multiple antennas have been estimated previously. Therefore, only a process for modulation is described below.

It is assumed that the AP sends a signal x(t), and the tag modulates data signals $e^{j\theta(t)}$ and $e^{j\phi(t)}$ on antennas 1 and 2 respectively. The signal that reaches a receiver after being reflected is as follows:

$$\begin{bmatrix} y_{rx}^1(t) \\ y_{rx}^2(t) \end{bmatrix} = \underbrace{\begin{bmatrix} h_{env}^{1,1}(t) & h_{env}^{1,2}(t) \\ h_{env}^{2,1}(t) & h_{env}^{2,2}(t) \end{bmatrix} \begin{bmatrix} x^1(t) \\ x^2(t) \end{bmatrix}}_{environment} + \underbrace{\begin{bmatrix} \tilde{h}_{1,1}(t) & \tilde{h}_{1,2}(t) \\ \tilde{h}_{2,1}(t) & \tilde{h}_{2,2}(t) \end{bmatrix} \begin{bmatrix} e^{j\theta(t)} \\ e^{j\phi(t)} \end{bmatrix}}_{backscatter} \quad (17)$$

in the formula (17), $h_{env}^{1,1}(t)$ is a channel parameter for the first receiving antenna at which a signal sent on the first antenna of the AP arrives after being reflected by the environment; $h_{env}^{1,2}(t)$ is a channel parameter for the first receiving antenna at which a signal sent on the second antenna of the AP arrives after being reflected by the environment; $h_{env}^{2,1}(t)$ is a channel parameter for the second receiving antenna at which a signal sent on the first antenna of the AP arrives after being reflected by the environment; $h_{env}^{2,2}(t)$ is a channel parameter for the second receiving antenna at which a signal sent on the second antenna of the AP arrives after being reflected by the environment. After the self-interference is eliminated, it is obtained that:

$$\begin{bmatrix} y_{rx}^1(t) \\ y_{rx}^2(t) \end{bmatrix} = \underbrace{\begin{bmatrix} \tilde{h}_{1,1}(t) & \tilde{h}_{1,2}(t) \\ \tilde{h}_{2,1}(t) & \tilde{h}_{2,2}(t) \end{bmatrix} \begin{bmatrix} e^{j\theta(t)} \\ e^{j\phi(t)} \end{bmatrix}}_{backscatter} \quad (18)$$

in the formula (18), $$\tilde{h}_{1,1}(t)=x^1(t)*[h_f^{1,1}(t)*h_b^{1,1}(t)]+x^2(t)*[h_f^{2,1}(t)*h_b^{1,1}(t)]$$

$$\tilde{h}_{1,2}(t)=x^1(t)*[h_f^{1,2}(t)*h_b^{1,2}(t)]+x^2(t)*[h_f^{2,1}(t)*h_b^{1,2}(t)] \quad (19)$$

$$\tilde{h}_{2,1}(t)=x^1(t)*[h_f^{2,1}(t)*h_b^{2,1}(t)]+x^2(t)*[h_f^{2,1}(t)*h_b^{2,1}(t)]$$

$$\tilde{h}_{2,2}(t)=x^1(t)*[h_f^{2,2}(t)*h_b^{2,2}(t)]+x^2(t)*[h_f^{2,1}(t)*h_b^{2,2}(t)] \quad (20)$$

Parameters in the formulas 19 and 20 has been estimated previously. Thus, a MIMO system is obtained. In a demodulation process, methods such as a minimum mean square error estimation MMSE and a maximum likelihood estimation MLE may be used for demodulation.

Figure 14:
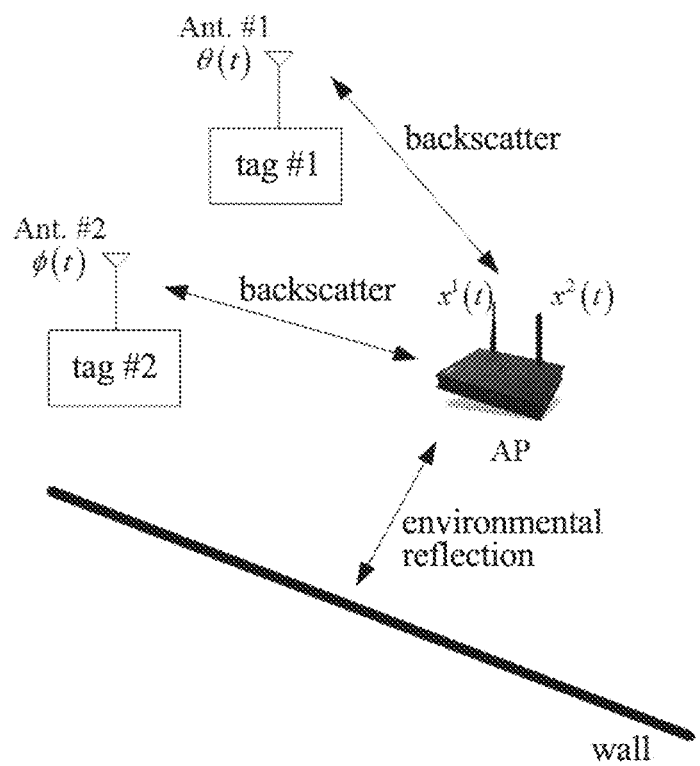
FIG. 14 is a schematic diagram showing that a multi-tag MIMO includes an AP including two antennas and two tags each including one antenna according to an embodiment of the present disclosure.

FIG. 14 shows a schematic diagram that a multi-tag MIMO includes an AP including two antennas and two tags each including one antenna according to an embodiment of the present disclosure.

It is assumed that the AP sends a signal x, a tag 1 modulates data signals $e^{j\theta(t)}$ and $e^{j\phi(t)}$ on antennas 1 and 2 respectively, and a tag 2 modulates data signals $e^{j\gamma(t)}$ and $e^{j\eta(t)}$ on antennas 3 and 4 respectively. The signal that reaches a receiver after being reflected is as follows:

$$\begin{bmatrix} y_{rx}^1(t) \\ y_{rx}^2(t) \end{bmatrix} = \underbrace{\begin{bmatrix} h_{env}^{1,1}(t) & h_{env}^{1,2}(t) \\ h_{env}^{2,1}(t) & h_{env}^{2,2}(t) \end{bmatrix}\begin{bmatrix} x^1(t) \\ x^2(t) \end{bmatrix}}_{environment} + \underbrace{\begin{bmatrix} \tilde{h}_{1,1}(t) & \tilde{h}_{1,2}(t) \\ \tilde{h}_{2,1}(t) & \tilde{h}_{2,2}(t) \end{bmatrix}\begin{bmatrix} e^{j\theta(t)} \\ e^{j\phi(t)} \end{bmatrix}}_{backscatter} \quad (21)$$

in the formula (21), $h_{env}^{1,1}(t)$ is a channel parameter for the first receiving antenna at which a signal sent on the first antenna of the AP arrives after being reflected by the environment; $h_{env}^{1,2}(t)$ is a channel parameter for the first receiving antenna at which a signal sent on the second antenna of the AP arrives after being reflected by the environment; $h_{env}^{2,1}(t)$ is a channel parameter for the second receiving antenna at which a signal sent on the first antenna of the AP arrives after being reflected by the environment; $h_{env}^{2,2}(t)$ is a channel parameter for the second receiving antenna at which a signal sent on the second antenna of the AP arrives after being reflected by the environment. All of these channel parameters have been obtained in step 4. After self-interference is eliminated, it is obtained that:

$$\begin{bmatrix} y_{rx}^1(t) \\ y_{rx}^2(t) \end{bmatrix} = \underbrace{\begin{bmatrix} \tilde{h}_{1,1}(t) & \tilde{h}_{1,2}(t) \\ \tilde{h}_{2,1}(t) & \tilde{h}_{2,2}(t) \end{bmatrix}\begin{bmatrix} e^{j\theta(t)} \\ e^{j\phi(t)} \end{bmatrix}}_{backscatter} \quad (22)$$

in the formula (22), $\tilde{h}_{1,1}(t) = x^1(t)*[h_f^{1,1}(t)*h_b^{1,1}(t)] + x^2(t)*[h_f^{2,1}(t)*h_b^{1,1}(t)]$ $\tilde{h}_{1,2}(t) = x^1(t)*[h_f^{1,2}(t)*h_b^{1,2}(t)] + x^2(t)*[h_f^{2,2}(t)*h_b^{1,2}(t)].$ (23)

$\tilde{h}_{2,1}(t) = x^1(t)*[h_f^{1,1}(t)*h_b^{2,1}(t)] + x^2(t)*[h_f^{2,1}(t)*h_b^{2,1}(t)]$ $\tilde{h}_{2,2}(t) = x^1(t)*[h_f^{1,2}(t)*h_b^{2,2}(t)] + x^2(t)*[h_f^{2,2}(t)*h_b^{2,2}(t)].$ (24)

Parameters in the formulas 23 and 24 has been estimated previously. Thus, a MIMO system is obtained. In a demodulation process, methods such as a minimum mean square error estimation MMSE and a maximum likelihood estimation MLE may be used for demodulation.

In the MIMO system, since each of multiple antennas of multiple tags may transmit multiple signals from multiple antennas of an AP, such that a transmission rate of data is further improved and spectrum efficiency of a tag system increases.

According to various embodiments of the present disclosure, in order to save energy, the tag is usually in a sleep mode and does not transmit any signal. When the tag (the sensor of the tag) collects enough information to be transmitted, the tag is activated and detects whether there is a paging signal for itself. The above process may be completed automatically by the tag. The tag is usually arranged in some special scenarios, and batteries are not often changed. Thus, it is required to adopt such sleep-activate mode to save power.

According to various embodiments of the present disclosure, the tag may also be activated periodically to detect whether there is a paging signal for itself.

Figure 15:
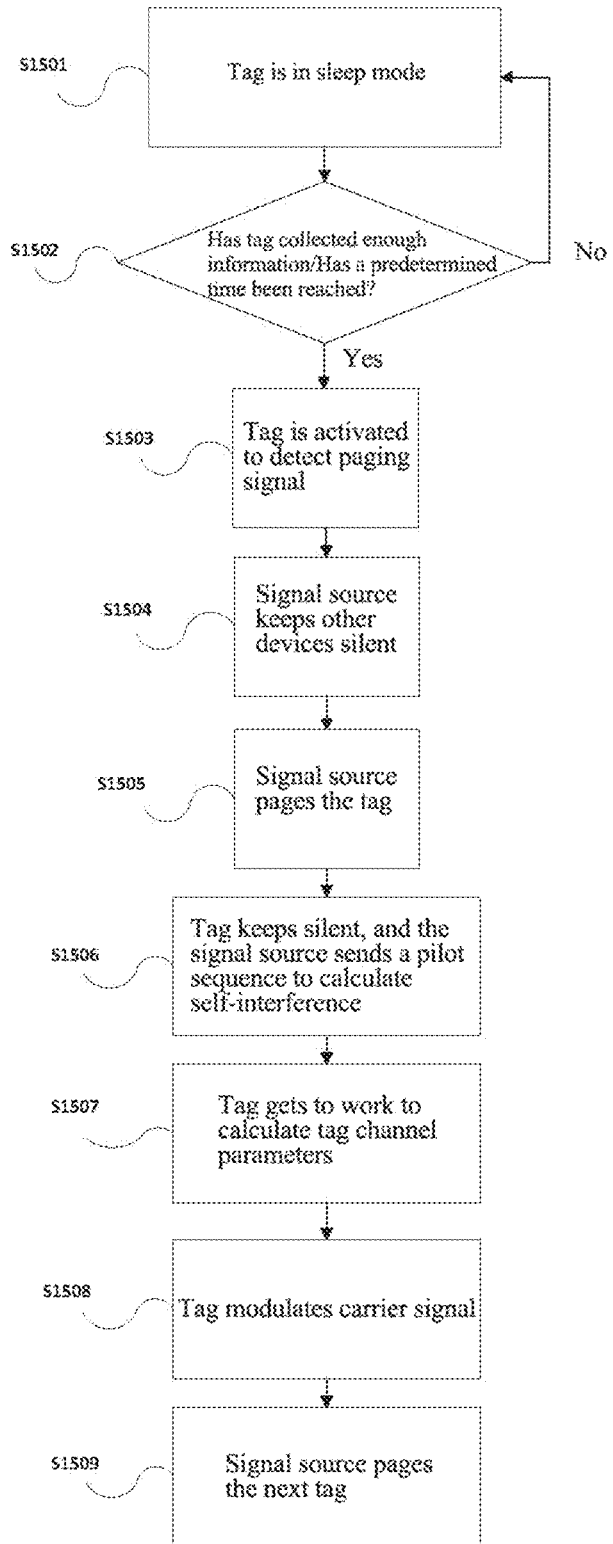
FIG. 15 is a flowchart showing a tag communication in an environmental retroreflective channel according to an embodiment of the present disclosure.

FIG. 15 is a flowchart showing a tag communication in an environmental retroreflective channel according to an embodiment of the present disclosure. According to the embodiment of the present disclosure, the tag communication in the environmental retroreflection channel may also be implemented by using the following method steps. A flowchart of the method step is shown in FIG. 15. The method includes the following steps: step 1: in order to save energy, the tag is in a sleep mode and does not transmit any signal at S1501. When the tag (the sensor of the tag) has collected enough information to be transmitted or when a predetermined time has been reached for the periodically activated tag at S1502, the tag is activated and detects whether there is a paging signal for itself at S1503, otherwise the tag keeps sleeping; step 2: a signal source AP sends a silent signal in a wired or wireless way, to keep other APs within its coverage area silent at S1504, such that the signal source AP may receive a signal from the tag in the next step; step 3: the signal source AP sends a paging signal to notify a corresponding tag at S1505; step 4: the tag keeps silent and does not modulate signals at S1506. At S1507, the signal source AP sends a pilot sequence, a training sequence or a cellular signal and so on during the silence period of the tag, to estimate channel parameters of a self-interference signal that reaches after being reflected by an environment; step 5: the tag is to operate, and the tag receives a signal sent by the AP and modulates the signal sent by the AP with preset information and reflects the signal sent by the AP, such that the signal source AP estimates a channel environment reflected by the tag; step 6: the tag modulates the signal to be sent to a carrier signal reflected by the tag; step 7: after the tag completes a transmission, the AP sends a paging signal to notify other tags or antennas to transmit.

An operation timing involved in steps in the systems described above is described below in conjunction with FIGS. 16 to 19. It should be noted that the following description is only illustrative, rather than limiting the present disclosure.

Figure 16:
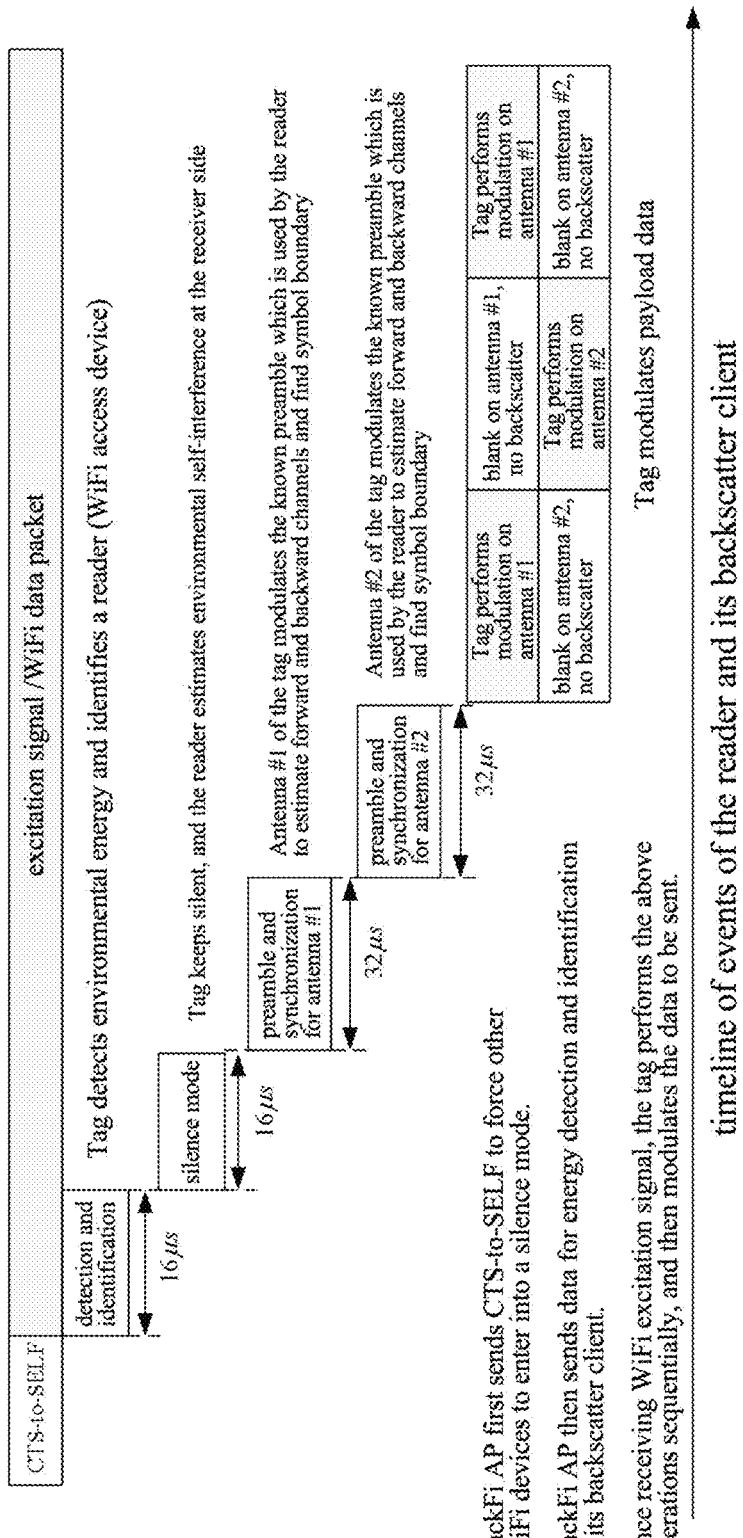
FIG. 16 is a diagram showing operation timing in a MISO system according to an embodiment of the present disclosure.

Referring to FIG. 16, an operation timing of a MISO system as described above is shown. Since the environmental backscatter communication system does not include a feedback channel, in order to complete a preparation work for a communication process, a fixed timing is generally adopted. FIG. 16 shows a timeline for events in the MISO system. A correspondence between events in the figure and steps in the present disclosure is as follows:

| Step 2 | Step 3 | Step 4 | Step 5 | Step 6 |
|---|---|---|---|---|
| CTS-to-SELF | detection and identification (16 μs) | silence mode (16 μs) | preamble and synchronization for antenna #1 (32 μs) preamble and synchronization for antenna #2 (32 μs) | tag modulates payload data |

A time period for step 2 is determined based on actual situations such as a topology of a system, and time periods for step 1, step 6 and step 7 are determined based on factors such as a configuration of the system and collected data. A specific workflow for the respective steps or events is: after step 2 is completed, step 3 is performed; after step 3 with a duration of 16 μs is completed, step 4 is performed directly; after step 4 with a duration of 16 μs is completed, step 5 is performed directly; a duration for operations of antennas #1 and #2 in step 5 is 64 μs, and step 6 is performed after step 5 is completed. It should be noted that time periods for events here are typical values, which may also be changed based on actual situations of environments and systems.

Figure 17:
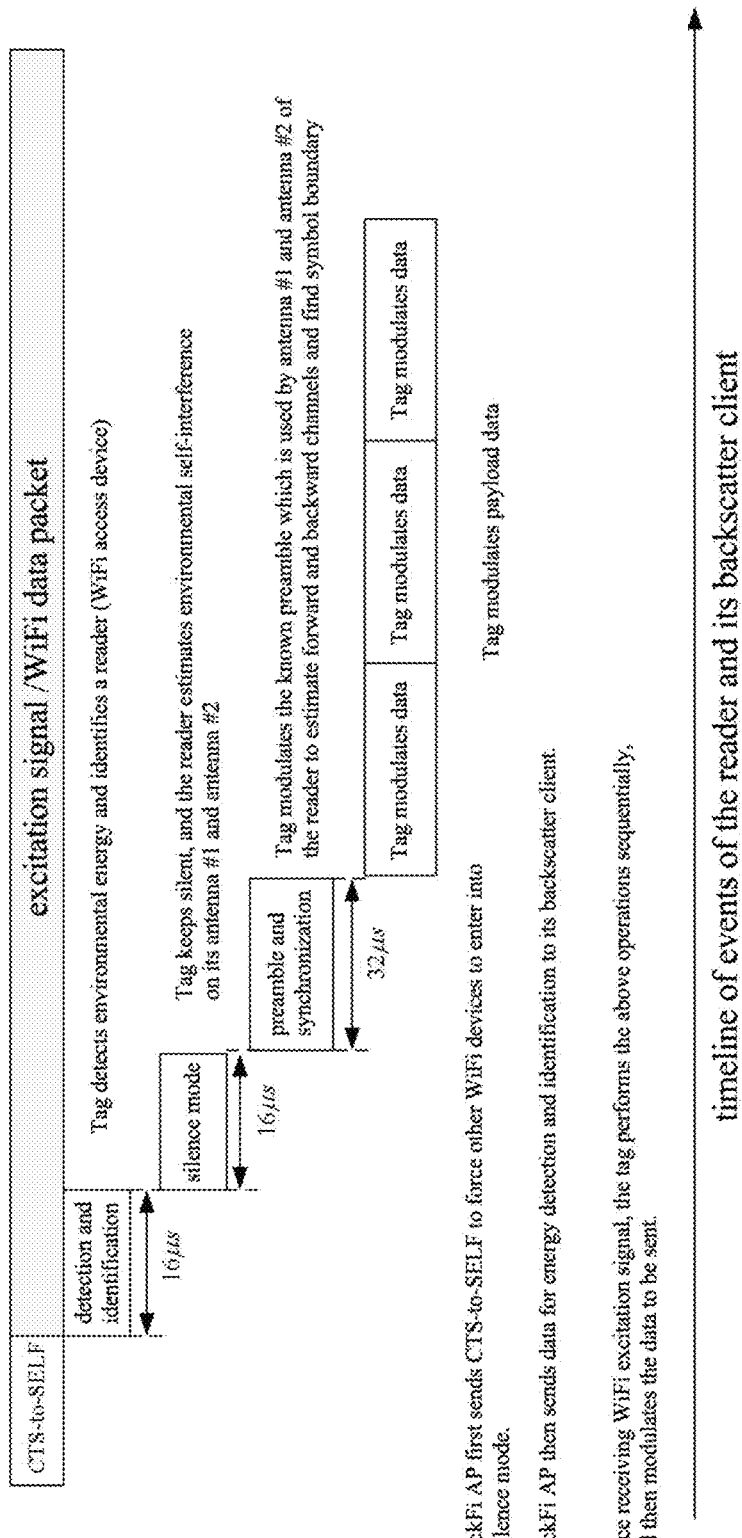
FIG. 17 is a diagram showing operation timing in a SIMO system according to an embodiment of the present disclosure.

Referring to FIG. 17, an operation timing of a SIMO system as described above is shown. Since the environmental backscatter communication system does not include a feedback channel, in order to complete a preparation work for a communication process, a fixed timing is generally adopted. FIG. 17 shows a timeline for events in the SIMO system. A correspondence between events in the figure and steps in the present disclosure is as follows:

| Step 2 | Step 3 | Step 4 | Step 5 | Step 6 |
|---|---|---|---|---|
| CTS-to-SELF | detection and identification (16 μs) | silence mode (16 μs) | preamble and synchronization (32 μs) | tag modulates payload data |

A time period for step 2 is determined based on actual situations such as a topology of a system, and time periods for step 1, step 6 and step 7 are determined based on factors such as a configuration of the system and collected data. A specific workflow for the respective steps or events is: after step 2 is completed, step 3 is performed; after step 3 with a duration of 16 μs is completed, step 4 is performed directly; after step 4 with a duration of 16 μs is completed, step 5 is performed directly; and step 6 is performed after step 5 with a duration of 32 μs is completed. It should be noted that time periods for events here are typical values, which may also be changed based on actual situations of environments and systems.

Figure 18:
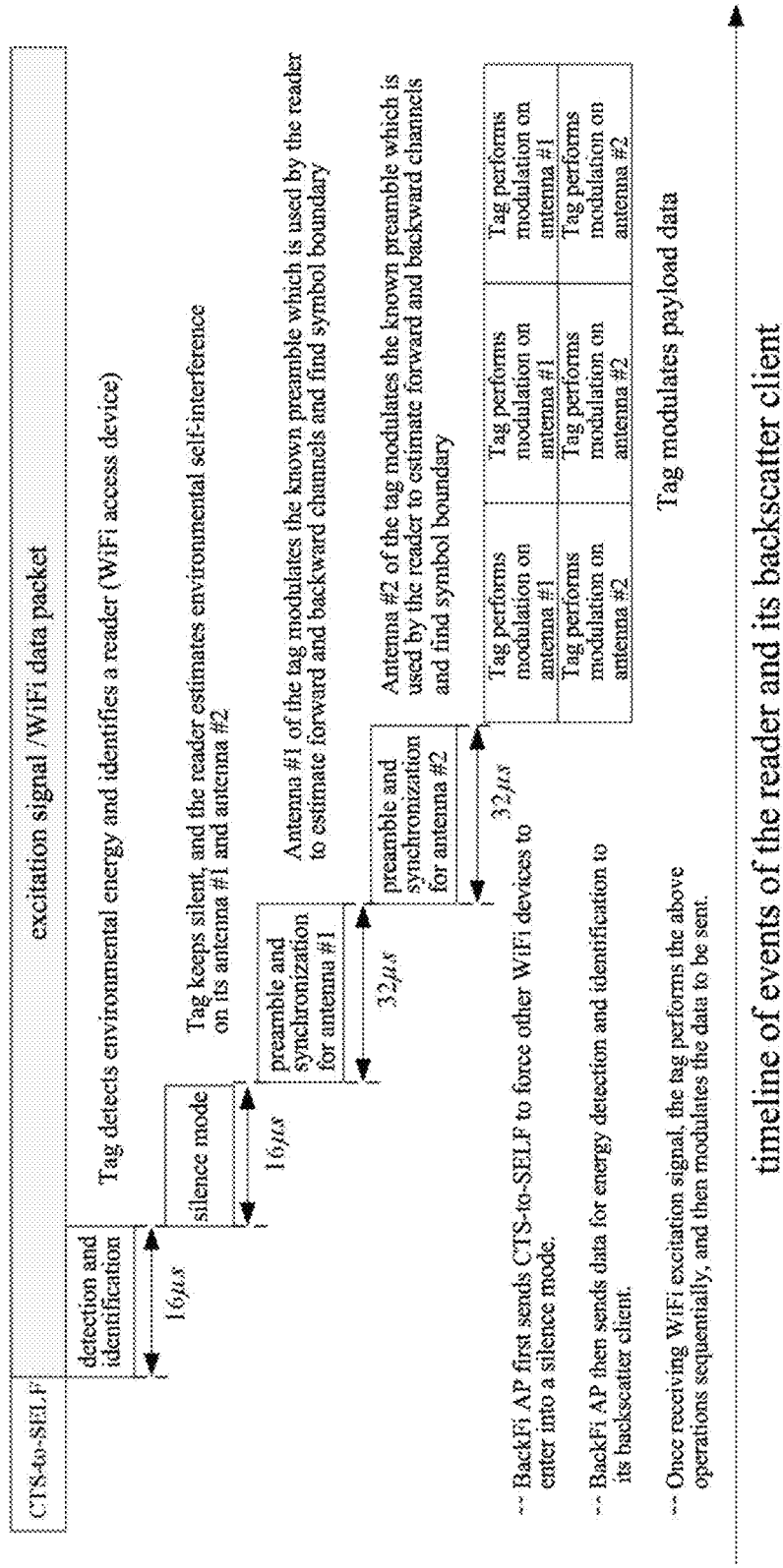
FIG. 18 is a diagram showing operation timing in a MIMO system consisting of an AP including two antennas and a tag including two antennas according to an embodiment of the present disclosure.

Referring to FIG. 18, it is shown that an operation timing of a MIMO system includes an AP including two antennas and a tag including two antennas. Since the environmental backscatter communication system does not include a feedback channel, in order to complete a preparation work for a communication process, a fixed timing is generally adopted. FIG. 18 shows a timeline for events in the MIMO system. A correspondence between events in the figure and steps in the present disclosure is as follows:

| Step 2 | Step 3 | Step 4 | Step 5 | Step 6 |
|---|---|---|---|---|
| CTS-to-SELF | detection and identification (16 μs) | silence mode (16 μs) | preamble and synchronization for antenna #1 (32 μs) preamble and synchronization for antenna #2 (32 μs) | tag modulates payload data |

A time period for step 2 is determined based on actual situations such as a topology of a system, and time periods for step 1, step 6 and step 7 are determined based on factors such as a configuration of the system and collected data. A specific workflow for the respective steps or events is: after step 2 is completed, step 3 is performed; after step 3 with a duration of 16 μs is completed, step 4 is performed directly; after step 4 with a duration of 16 μs is completed, step 5 is performed directly; a duration for antennas #1 and #2 is 64 μs, and step 6 is performed after step 5 is completed. It should be noted that time periods for events here are typical values, which may also be changed based on actual situations of environments and systems.

Figure 19:
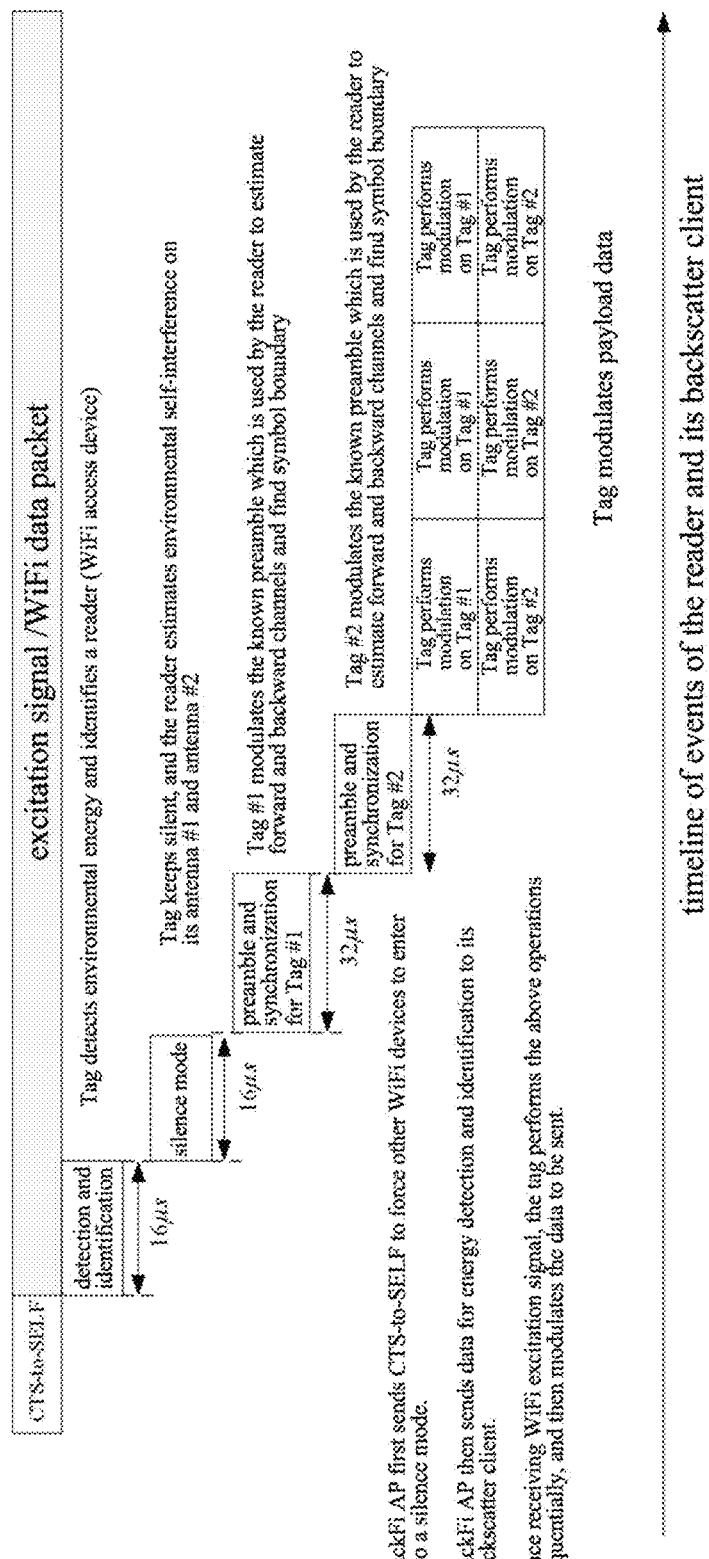
FIG. 19 is a diagram showing operation timing in a multi-tag MIMO system consisting of an AP including two antennas and two tags each including one antenna according to an embodiment of the present disclosure.

Referring to FIG. 19, it is shown that an operation timing of a multi-tag MIMO system includes an AP including two antennas and two tags each including one antenna. Since the environmental backscatter communication system does not include a feedback channel, in order to complete a preparation work for a communication process, a fixed timing is generally adopted. FIG. 19 shows a timeline for events in the MIMO system. A correspondence between events in the figure and steps in the present disclosure is as follows:

| Step 2 | Step 3 | Step 4 | Step 5 | Step 6 |
|---|---|---|---|---|
| CTS-to-SELF | detection and identification (16 μs) | silence mode (16 μs) | preamble and synchronization for antenna #1 (32 μs) preamble and synchronization for antenna #2 (32 μs) | tag modulates payload data |

A time period for step 2 is determined based on actual situations such as a topology of a system, and time periods for step 1, step 6 and step 7 are determined based on factors such as a configuration of the system and collected data. A specific workflow for the respective steps or events is: after step 2 is completed, step 3 is performed; after step 3 with a duration of 16 μs is completed, step 4 is performed directly; after step 4 with a duration of 16 μs is completed, step 5 is performed directly; a duration for antennas #1 and #2 is 64 μs, and step 6 is performed after step 5 is completed. It should be noted that time periods for events here are typical values, which may also be changed based on actual situations of environments and systems.

Figure 20:
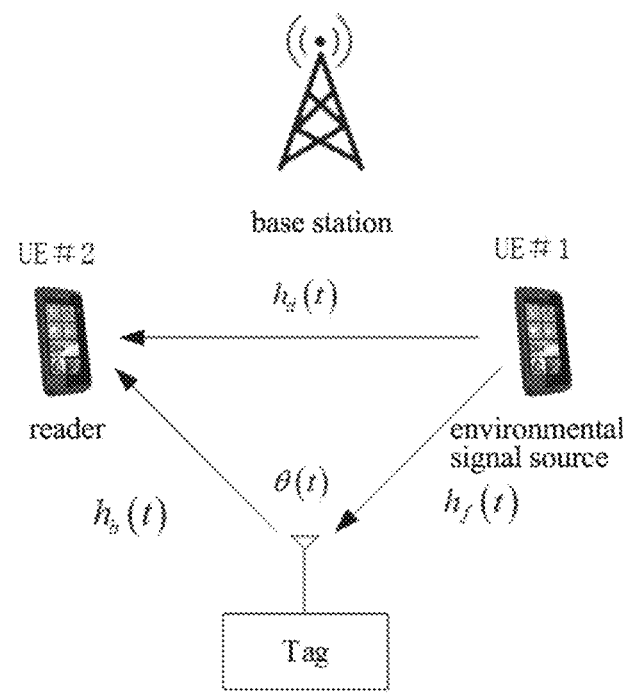
FIG. 20 shows another environmental backscatter communication system according to an embodiment of the present disclosure.

FIG. 20 shows another environmental backscatter communication system according to an embodiment of the present disclosure.

Referring to FIG. 20, it is shown that a device to device direct connection (sidelink) tag system includes a UE #1 as an environmental signal source and a UE #2 as a reader.

In this system, an environmental scattering signal (excitation signal) is a sidelink signal for the communication between a UE and another UE in a cellular system. The sidelink generally reuses resources of the uplink in accordance to the current 4G and 5G mobile communication system standards. In order to prevent interferences from other uplink user equipments, in step 2 a base station performs coordination by means of control signaling to keep other UE located within the coverage of UE #1's signal silent until a tag completes data transmission. In addition, the reader here may be either UE #2 or UE #1 itself. Here, a case where the reader is UE #2 is taken as an example here. It should be noted that if the reader is UE #2, UE #1 is required to continuously send signals known to UE #2, or to use some special signal structure. For example, in a LTE system, one time slot of the uplink includes 7 OFDM symbols and the fourth symbol in the middle is all pilot signals. Since this signal is known to UE #2, the tag information may be modulated on this symbol, while other symbols are not processed. If the reader is UE #1 itself, UE #1 may perform normal communication with UE #2, because UE #1 knows signals sent by itself. The corresponding working principle may also be extended to a multi-antenna scenario, that is, a scenario in which the UE and the tag include multiple antennas. Since the examples of multi-antenna scenarios have been previously described in detail, the following description is only made for the case where both the UE and the tag include a single antenna.

Figure 21:
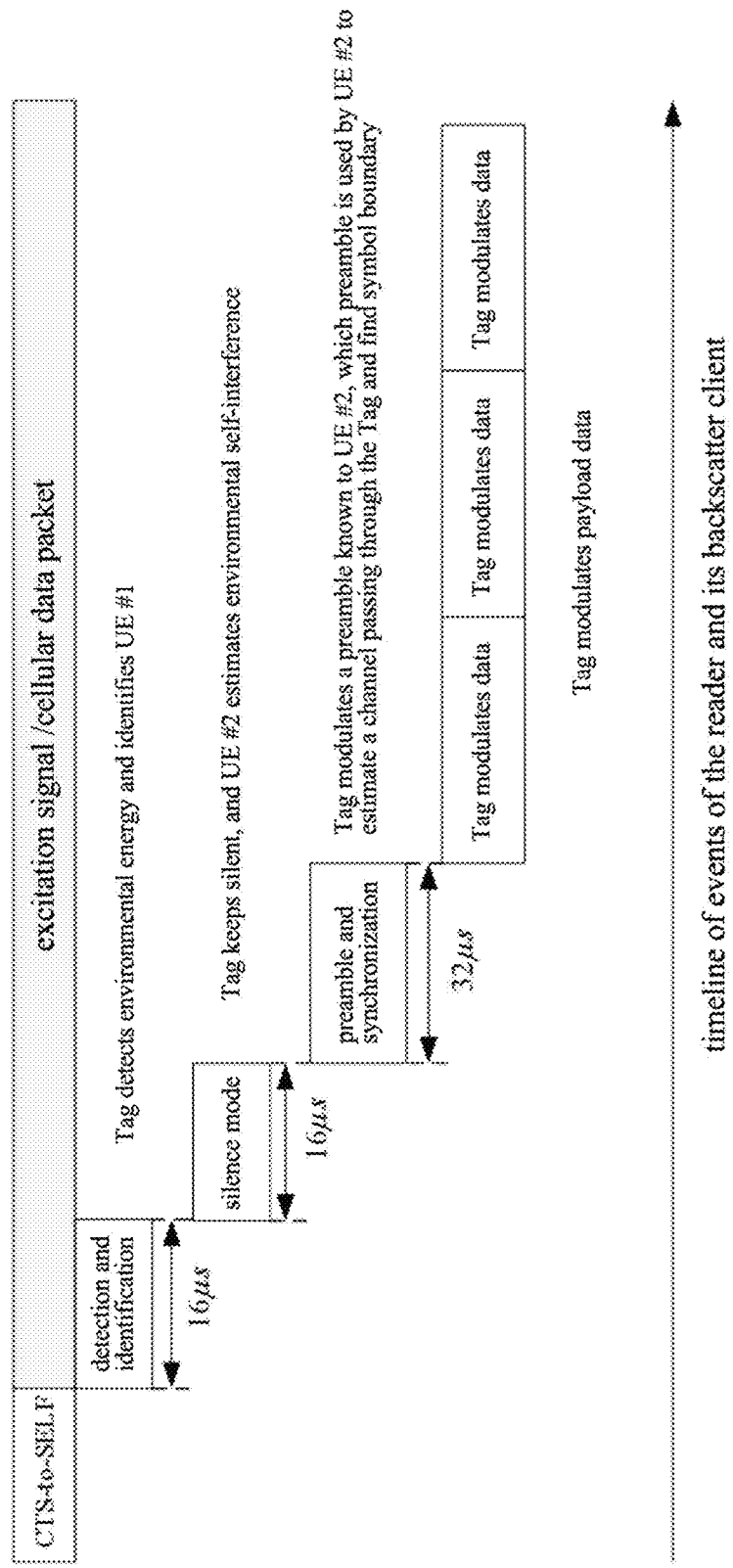
FIG. 21 is a timing diagram showing a work in the environmental backscatter communication system of FIG. 20.

Since the environmental backscatter communication system does not include a feedback channel, in order to complete a preparation work for a communication process, a fixed timing is generally adopted. FIG. 21 shows a timeline for events in a sidelink tag system. A correspondence between events in the figure and steps in the present disclosure is as follows:

| Step 2 | Step 3 | Step 4 | Step 5 | Step 6 |
|---|---|---|---|---|
| CTS-to-SELF | detection and identification (16 μs) | silence mode (16 μs) | preamble and synchronization for Tag (32 μs) | tag modulates payload data |

A time period for step 2 is determined based on actual situations such as topology of a system, and time periods for step 1, step 6 and step 7 are determined based on factors such as configuration of the system and collected data. A specific workflow for the respective steps or events is: after step 2 is completed, step 3 is performed; after step 3 with a duration of 16 μs is completed, step 4 is performed directly; after step 4 with a duration of 16 μs is completed, step 5 is performed directly; and step 6 is performed after step 5 with a duration of 32 μs is completed. It should be noted that time periods for events here are typical values, which may also be changed based on the actual situations of environments and systems.

In step 4, it is assumed that UE #1 sends a known signal x(t) to UE #2 and noise is not considered. The signal received by the UE #2 is:

$$y_{env}(t) = \underbrace{x(t) * h_d(t)}_{environment} \quad (25)$$

in the formula (25), $h_d(t)$ represents channel parameters for a direct connection between UE #1 and UE #2. Since x(t) is known, the estimated value of $h_d(t)$ may be obtained.

In step 5, it is assumed that a signal x(t) is sent by the AP and reaches the Tag. The Tag modulates a pilot signal $e^{j\theta(t)}$. The signal that reaches UE #2 after being reflected is as follows:

$$y_{back}(t) = \underbrace{\{[x(t) * h_f(t)] \cdot e^{j\theta(t)}\} * h_b(t)}_{backscatter} \quad (26)$$

$$= x(t) * [h_f(t) * h_b(t)] \cdot e^{j\theta(t)}$$

in the formula (26), $h_f(t)$ represents a channel through which x(t) is transmitted from a signal source (UE #1) to the tag; $h_b(t)$ represents a channel through which the signal is transmitted from the tag to the reader (UE #2). In the formula (26), since x(t) and $e^{j\theta(t)}$ are known, UE #2 may estimate parameter $h_f(t)*h_b(t)$ for the channel passing through the tag, and takes a parameter calculated based on the following formula as a composite channel parameter for the tag.

$$\tilde{h}(t) = x(t) * [h_f(t) * h_b(t)] \quad (27)$$

In step 6, it is assumed that UE #1 sends a signal x(t), and the tag modulates a data signal $e^{j\theta(t)}$. A signal that reaches UE #2 is as follows:

$$y_{rx}(t) = \underbrace{x(t) * h_d(t)}_{environment} + \underbrace{\{[x(t) * h_f(t)] \cdot e^{j\theta(t)}\} * h_b(t)}_{backscatter} \quad (28)$$

$$= y_{env} + \tilde{h}(t) \cdot e^{j\theta(t)}$$

In the formula (28), $y_{env}$ is an interference signal generated by a direct connection between UE #1 and UE #2 and has been estimated in step 4. Therefore, it may be directly eliminated. $\tilde{h}(t)$ is a composite channel parameter passing through the Tag and has been estimated in step 5, and therefore $e^{j\theta(t)}$ may be demodulated.

In the above sidelink tag system, the UE moves and may be close to the tag, such that a strength of the excitation signal increases, thereby reducing a bit error rate and improving robustness of the system under a state that the environment changes or a moving state.

The present disclosure may be applied but not limited to the fields of finance, biology, logistics, smart home and so on. The application of the present disclosure is described below only for the purpose of illustration rather than limitation.

Smart card transfer and payment. Smart card may obtain energy from the surrounding wireless signals and implements a direct communication with each other by backscattering the signals. For example, with backscatter technology, a timely transfer between two passive bank cards may be implemented.

Logistics tracking. An electronic tag is attached to an article, such that the article is always in an identification state. In this way, logistics information may be tracked in real time, and once the article is lost, an alarm may be issued and the article is positioned in time.

Embedded biochip. Electronic chips are embedded into organisms, and communicate with outside world using the backscatter technology. That is, a radio frequency signal is emitted from the outside of the organisms to make the electronic chip operate and is backscattered to transmit information to the outside of the organisms.

Smart home. In a scenario where a Wi-Fi gateway communicates with a communication device normally, sensors in the smart home may backscatter their own state information by means of Wi-Fi signals. With the backscatter technology and in conjunction with full duplex technology, the gateway may collect the required environment or device parameter information while communicating with a portable terminal, for further analysis and processing.

In addition, it should be noted that, a computer readable storage medium is further provided according to another embodiment of the present disclosure. The storage medium may include executable computer instructions which, when being executed by a computer, cause the computer to implement the methods according to the embodiments of the present disclosure.

The technology according to the present disclosure may be applied into various products. For example, the access point AP mentioned in the present disclosure may be a base station. The base station may be implemented as any type of evolved Node B (eNB), such as a macro eNB and a small eNB. The small eNB may be an eNB that covers a cell smaller than a macro cell, such as a pico eNB, a micro eNB and a home (femto) eNB. Alternatively, the base station may be implemented as any other types of base stations such as a NodeB and a base transceiver station (BTS). The base station may include: a main body (which is also referred to as a base station device) configured to control wireless communication; and one or more remote wireless head ends (RRH) that are arranged in different places from the main body. In addition, various types of terminals described below may operate as base stations by temporarily or semi-persistently performing functions of a base station.

For example, a UE mentioned in the present disclosure may be implemented as a mobile terminal (such as a smartphone, a tablet personal computer (PC), a notebook PC, a portable game terminal, a portable/dongle type mobile router, and a digital camera), or an in-vehicle terminal (such as a vehicle navigation device). The UE may also be implemented as a terminal (which is also referred to as a machine type communication (MTC) terminal) that performs machine-to-machine (M2M) communication. Furthermore, the UE may be a wireless communication module (such as an integrated circuit module including a single chip) mounted on each of the terminals described above.

Figure 22:
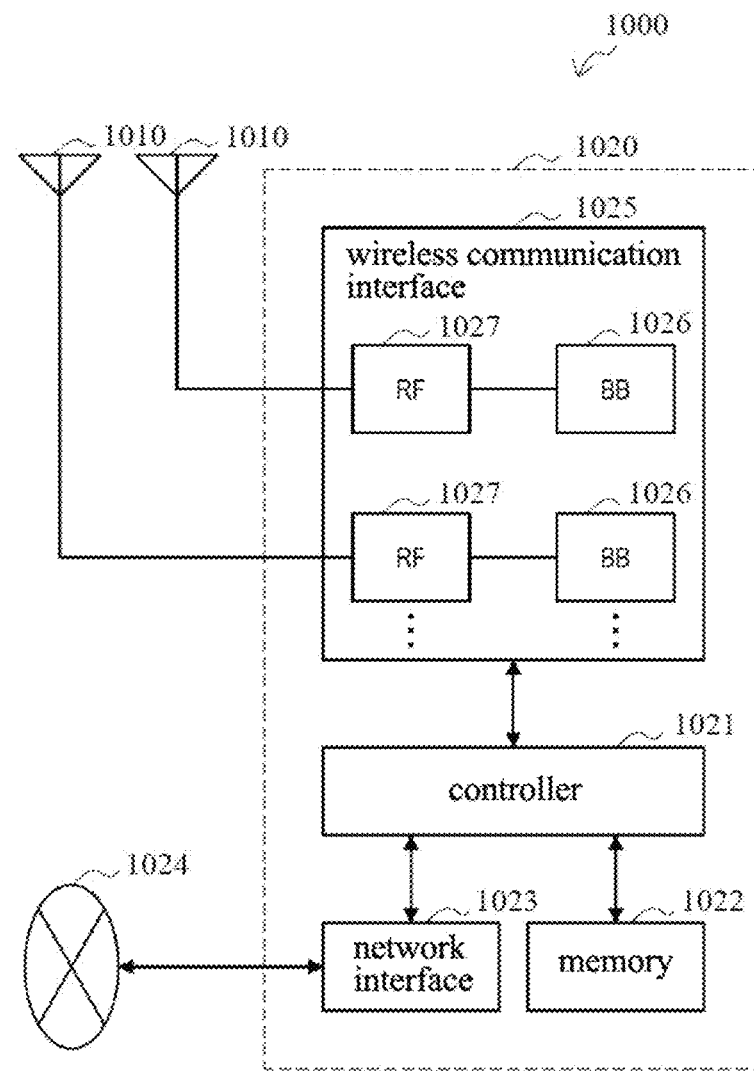
FIG. 22 is a block diagram showing the first example of a schematic configuration of an eNB (evolution Node Base Station) or a gNB (a base station in a fifth generation communications system) to which the present disclosure is applicable.

FIG. 22 is a block diagram showing the first example of a schematic configuration of an eNB functioning as a base station to which the technology according to the present disclosure may be applied. An eNB 1000 includes one or more antennas 1010 and a base station device 1020. The base station device 1020 and each of one or more antennas 1010 may be connected to each other via an RF cable.

Each of the one or more antennas 1010 includes a single antenna element or multiple antenna elements (such as multiple antenna elements included in a multiple-input multiple-output (MIMO) antenna), and is used for transmitting and receiving a radio signal by the base station device 1020. The eNB 1000 may include multiple antennas 1010, as shown in FIG. 22. For example, the multiple antennas 1010 may be compatible with multiple frequency bands used by the eNB 1000. Although FIG. 22 shows an example in which the eNB 1000 includes multiple antennas 1010, the eNB 1000 may also include a single antenna 1010.

The base station device 1020 includes a controller 1021, a memory 1022, a network interface 1023 and a wireless communication interface 1025.

The controller 1021 may be, for example, a CPU or a DSP, and operates various functions of a high layer of the base station device 1020. For example, the controller 1021 generates a data packet based on data in a signals processed by the wireless communication interface 1025, and transfers the generated packet via the network interface 1023. The controller 1021 may bundle data from multiple baseband processors to generate a bundled packet, and transfer the generated bundled packet. The controller 1021 may have logic functions for performing control such as radio resource control, radio bearer control, mobility management, admission control and scheduling. The control may be performed in combination with an adjacent eNB or a core network node. The memory 1022 includes an RAM and an ROM, and stores a program that is executed by the controller 1021, and various types of control data (such as a terminal list, transmission power data, and scheduling data).

The network interface 1023 is a communication interface for connecting the base station device 1020 to a core network 1024. The controller 1021 may communicate with a core network node or another eNB via the network interface 1023. In this case, the eNB 1000 and the core network node or the other eNB may be connected to each other via a logic interface (such as an S1 interface and an X2 interface). The network interface 1023 may also be a wired communication interface or a wireless communication interface for radio backhaul. If the network interface 1023 is a wireless communication interface, the network interface 1023 may use a frequency band for wireless communication higher than that used by the wireless communication interface 1025.

The wireless communication interface 1025 supports any cellular communication scheme (such as long term evolution (LTE) and LTE-advanced), and provides a wireless connection to a terminal located in a cell of the eNB 1000 via the antenna 1010. The wireless communication interface 1025 may generally include, for example, a base band (BB) processor 1026 and an RF circuit 1027. The BB processor 1026 may perform, for example, encoding/decoding, modulation/demodulation, and multiplexing/de-multiplexing, and performs various types of signal processing of the layers (for example L1, medium access control (MAC), radio link control (RLC), and packet data convergence protocol (PDCP)). Instead of the controller 1021, the BB processor 1026 may have a part or all of the logical functions described above. The BB processor 1026 may be a memory that stores the communication control programs or a module that includes a processor and a related circuit configured to execute the programs. The function of the BB processor 1026 may be changed when the programs are updated. The module may be a card or a blade which is inserted into a slot of the base station device 1020. Alternatively, the module may be a chip mounted on the card or the blade. In addition, the RF circuit 1027 may include, for example, a frequency mixer, a filter or an amplifier, and transmits and receives a radio signal via the antenna 1010.

As shown in FIG. 22, the wireless communication interface 1025 may include multiple BB processors 1026. For example, the multiple BB processors 1026 may be compatible with multiple frequency bands used by the eNB 1000. As shown in FIG. 22, the wireless communication interface 1025 may include multiple RF circuits 1027. For example, the multiple RF circuits 1027 may be compatible with multiple antenna elements. Although FIG. 22 shows an example in which the wireless communication interface 1025 includes multiple BB processors 1026 and multiple RF circuits 1027, the wireless communication interface 1025 may also include a single BB processor 1026 and a single RF circuit 1027.

Figure 23:
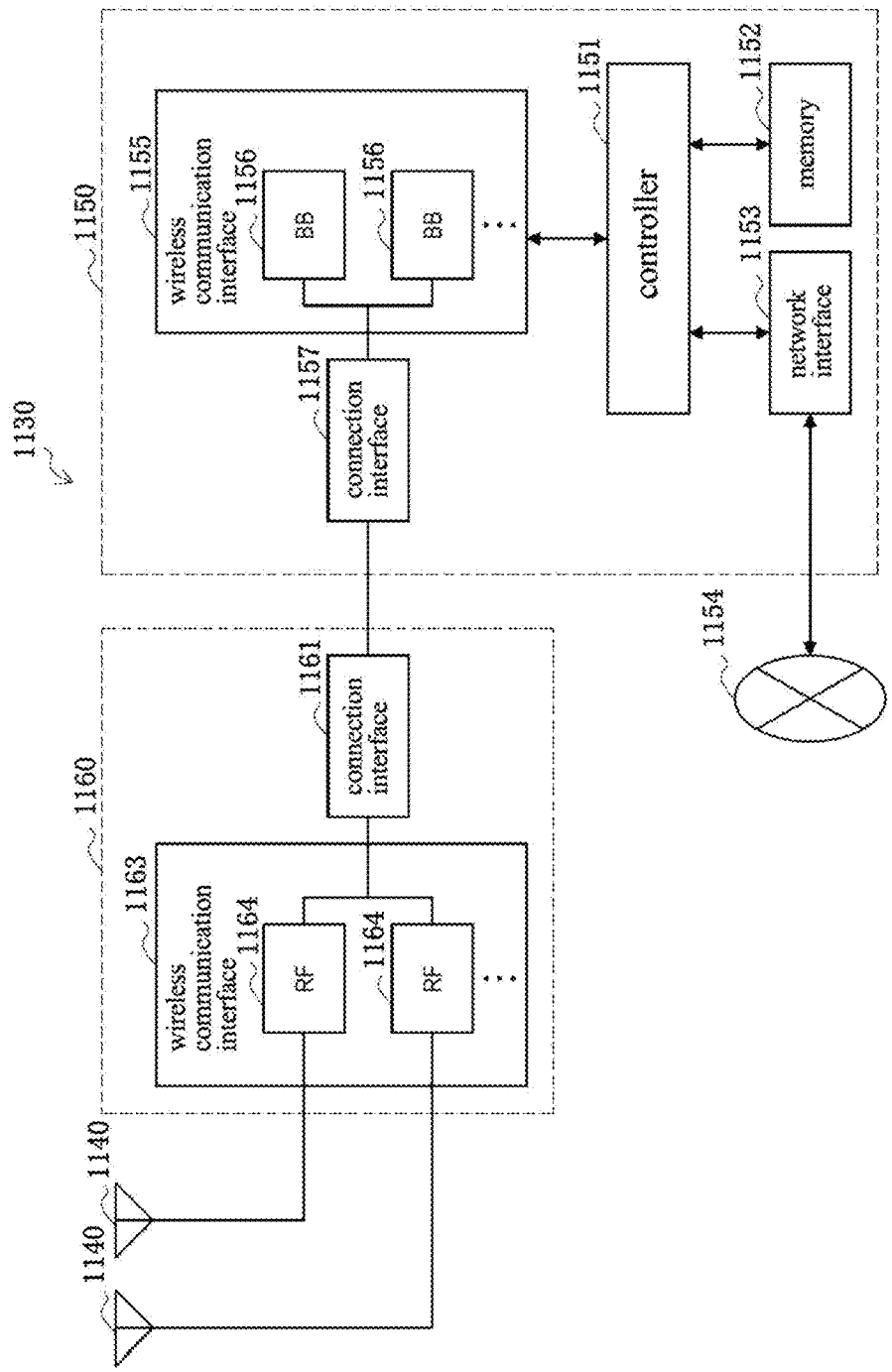
FIG. 23 is a block diagram showing the second example of a schematic configuration of an eNB or a gNB to which the present disclosure is applicable.

FIG. 23 is a block diagram showing the second example of a schematic configuration of an eNB functioning as a base station to which the technology according to the present disclosure may be applied. An eNB 1130 includes one or more antennas 1140, a base station device 1150, and an RRH 1160. The RRH 1160 and each of one or more antennas 1140 may be connected to each other via an RF cable. The base station device 1150 and the RRH 1160 may be connected to each other via a high speed line such a fiber cable.

Each of the one or more antennas 1140 includes a single antenna element or multiple antenna elements (such as multiple antenna elements included in an MIMO antenna), and is used for transmitting and receiving a radio signal by the RRH 1160. As shown in FIG. 23, the eNB 1130 may include multiple antennas 1140. For example, the multiple antennas 1140 may be compatible with multiple frequency bands used by the eNB 1130. Although FIG. 23 shows an example in which the eNB 1130 includes multiple antennas 1140, the eNB 1130 may also include a single antenna 1140.

The base station device 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 22.

The wireless communication interface 1155 supports any cellular communication scheme (such as LTE and LTE-advanced) and provides wireless communication to a terminal located in a sector corresponding to the RRH 1160 via the RRH 1160 and the antenna 1140. The wireless communication interface 1155 may generally include, for example, a BB processor 1156. The BB processor 1156 is the same as the BB processor 1026 described with reference to FIG. 22, except that the BB processor 1156 is connected to the RF circuit 1164 of the RRH 1160 via the connection interface 1157. As shown in FIG. 23, the wireless communication interface 1155 may include multiple BB processors 1156. For example, the multiple BB processors 1156 may be compatible with multiple frequency bands used by the eNB 1130. Although FIG. 23 shows an example in which the wireless communication interface 1155 includes multiple BB processors 1156, the wireless communication interface 1155 may also include a single BB processor 1156.

The connection interface 1157 is an interface for connecting the base station device 1150 (the wireless communication interface 1155) to the RRH 1160. The connection interface 1157 may also be a communication module for communication in the above high-speed line that connects the base station device 1150 (the wireless communication interface 1155) to the RRH 1160.

The RRH 1160 includes a connection interface 1161 and a wireless communication interface 1163.

The connection interface 1161 is an interface for connecting the RRH 1160 (the wireless communication interface 1163) to the base station device 1150. The connection interface 1161 may also be a communication module for the communication in the above high-speed line.

The wireless communication interface 1163 transmits and receives a radio signal via the antenna 1140. The wireless communication interface 1163 may generally include, for example, an RF circuit 1164. The RF circuit 1164 may include, for example, a frequency mixer, a filter and an amplifier, and transmits and receives a radio signal via the antenna 1140. The wireless communication interface 1163 may include multiple RF circuits 1164, as shown in FIG. 23. For example, the multiple RF circuits 1164 may support multiple antenna elements. Although FIG. 23 shows an example in which the wireless communication interface 1163 includes multiple RF circuits 1164, the wireless communication interface 1163 may also include a single RF circuit 1164.

Figure 24:
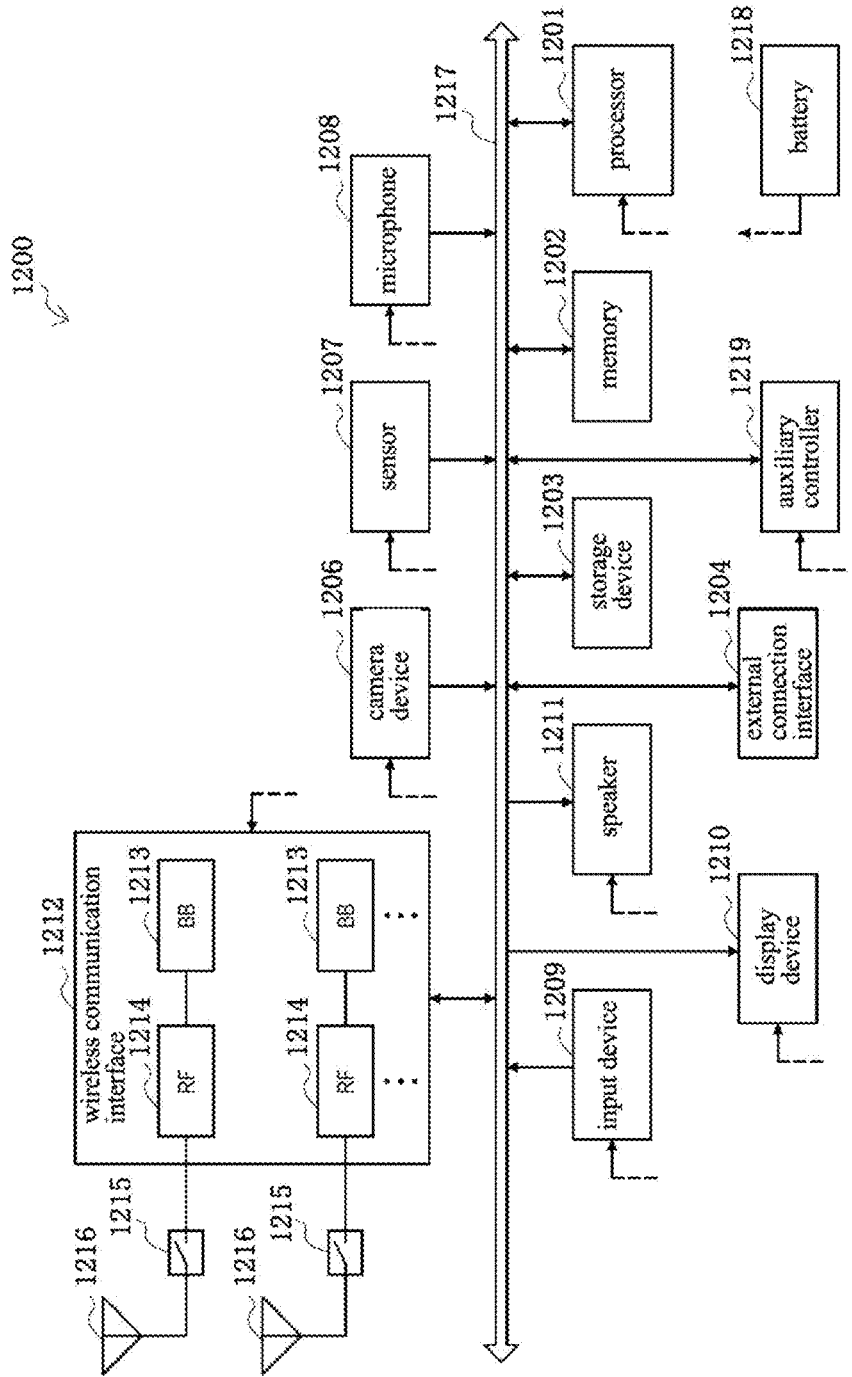
FIG. 24 is a block diagram showing an example of a schematic configuration of a smartphone to which the present disclosure is applicable.

FIG. 24 is a block diagram showing an example of a schematic configuration of a smartphone 1200 functioning as a user equipment to which the technology according to the present disclosure may be applied. The smartphone 1200 includes a processor 1201, a memory 1202, a storage device 1203, an external connection interface 1204, a camera device 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be for example CPU or system on chip (SoC), and control functions of an application layer and another layer of the smartphone 1200. The memory 1202 includes an RAM and an ROM, and stores a program executed by the processor 1201 and data. The storage device 1203 may include a storage medium such as a semiconductor memory and a hard disk. The external connection interface 1204 is an interface for connecting an external device (such as a memory card and a universal serial bus (USB) device) to the smartphone 1200.

The camera device 1206 includes an image sensor (such as a charge coupled device (CCD) and a complementary metal oxide semiconductor (CMOS)) and generates a captured image. The sensor 1207 may include a group of sensors, such as a measurement sensor, a gyroscope sensor, a geomagnetic sensor, and an acceleration sensor. The microphone 1208 converts sound inputted to the smartphone 1200 into audio signals. The input device 1209 includes, for example, a touch sensor configured to detect touch onto a screen of the display device 1210, a keypad, a keyboard, a button, or a switch, and receives an operation or information inputted from a user equipment. The display device 1210 includes a screen (such as a liquid crystal display (LCD) and an organic light emitting diode (OLED) display), and displays an output image of the smartphone 1200. The speaker 1211 converts audio signals outputted from the smartphone 1200 to sound.

The wireless communication interface 1212 supports any cellular communication scheme (such as LTE and LTE-advanced), and performs wireless communication. The wireless communication interface 1212 may generally include, for example, a BB processor 1213 and an RF circuit 1214. The BB processor 1213 may perform, for example, encoding/decoding, modulation/demodulation and multiplexing/de-multiplexing, and performs various types of signal processing for wireless communication. In addition, the RF circuit 1214 may include, for example, a frequency mixer, a filter and an amplifier, and transmits and receives a radio signal via the antenna 1216. The wireless communication interface 1212 may be one chip module on which the BB processor 1213 and the RF circuit 1214 are integrated. As shown in FIG. 24, the wireless communication interface 1212 may include multiple BB processors 1213 and multiple RF circuits 1214. Although FIG. 24 shows an example in which the wireless communication interface 1212 includes multiple BB processors 1213 and multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a wireless local area network (LAN) scheme. In this case, the wireless communication interface 1212 may include the BB processor 1213 and the RF circuit 1214 for each wireless communication scheme.

Each of the one or more antenna switches 1215 switches a connection destination of the antennas 1216 among multiple circuits (for example circuits for different wireless communication schemes) included in the wireless communication interface 1212.

Each of the one or more antennas 1216 includes a single antenna element or multiple antenna elements (such as multiple antenna elements included in an MIMO antenna), and is used for transmitting and receiving a radio signal by the wireless communication interface 1212. The smartphone 1200 may include multiple antennas 1216, as shown in FIG. 24. Although FIG. 24 shows an example in which the smartphone 1200 includes multiple antennas 1216, the smartphone 1200 may also include a single antenna 1216.

Furthermore, the smartphone 1200 may include the antenna 1216 for each wireless communication scheme. In this case, the antenna switches 1215 may be omitted from the configuration of the smartphone 1200.

The bus 1217 connects the processor 1201, the memory 1202, the storage device 1203, the external connection interface 1204, the camera device 1206, the sensor 1207, the microphone 1208, the input device 1209, the display device 1210, the speaker 1211, the wireless communication interface 1212, and the auxiliary controller 1219 to each other. The battery 1218 supplies power to blocks of the smartphone 1200 shown in FIG. 24 via feeder lines, which are partially shown as dashed lines in the figure. The auxiliary controller 1219 operates a minimum necessary function of the smartphone 1200, for example, in a sleep mode.

Figure 25:
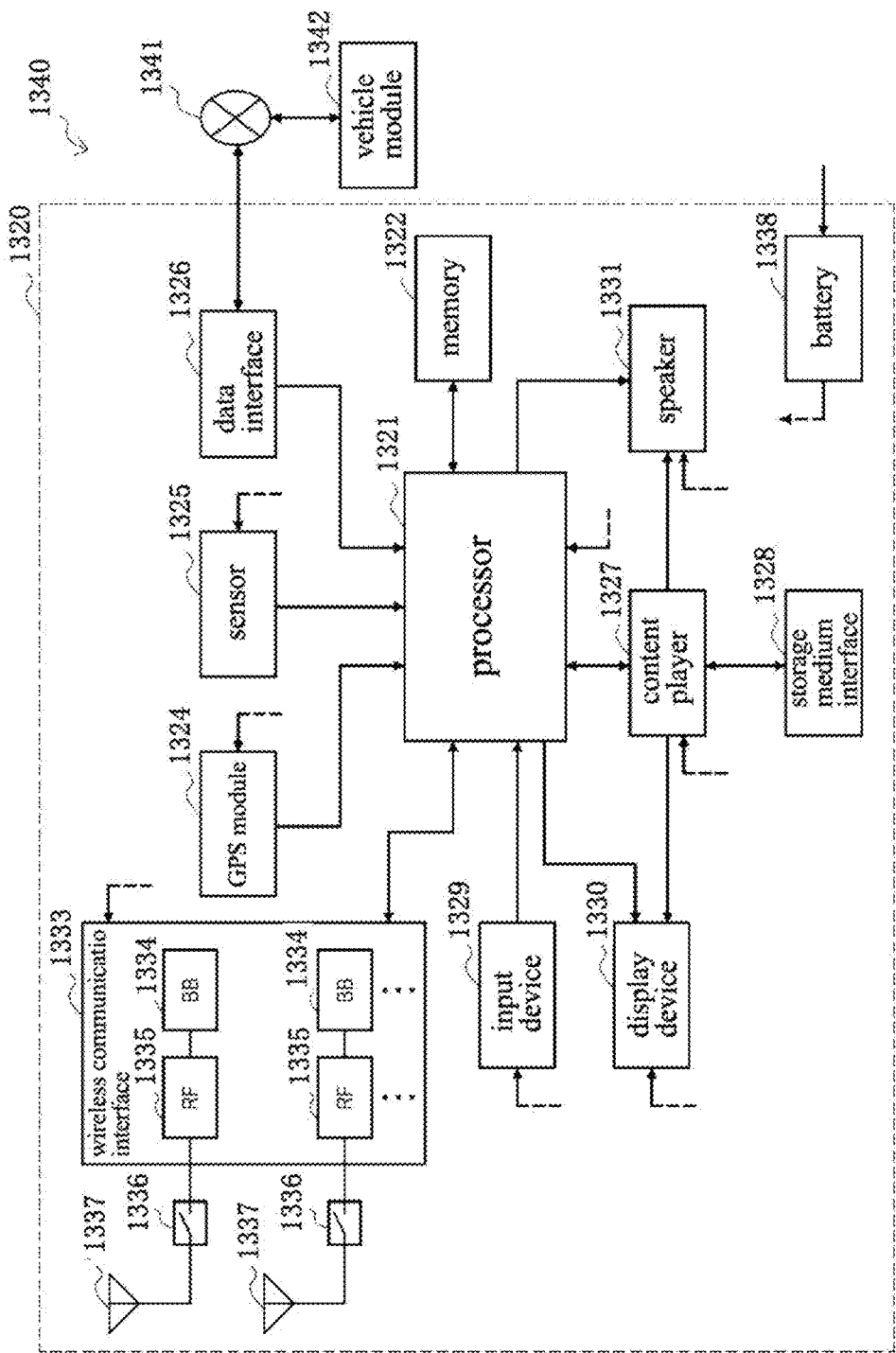
FIG. 25 is a block diagram showing an example of a schematic configuration of a vehicle navigation device to which the present disclosure is applicable.

FIG. 25 is a block diagram showing an example of a schematic configuration of a vehicle navigation device 1320 to which the technology according to the present disclosure may be applied. The vehicle navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be for example a CPU or a SoC, and controls navigation function and other functions of the vehicle navigation device 1320. The memory 1322 includes an RAM and an ROM, and stores a program executed by the processor 1321 and data.

The GPS module 1324 measures a position (such as a latitude, a longitude and a height) of the vehicle navigation device 1320 by using a GPS signal received from a GPS satellite. The sensor 1325 may include a group of sensors, such as a gyroscope sensor, a geomagnetic sensor and an air pressure sensor. The data interface 1326 is connected to, for example, an in-vehicle network 1341 via a terminal that is not shown, and acquires data generated by the vehicle (such as vehicle speed data).

The content player 1327 reproduces contents stored in a storage medium (such as a CD and a DVD), which is inserted into the storage medium interface 1328. The input device 1329 includes, for example, a touch sensor configured to detect touch onto a screen of the display device 1330, a button or a switch, and receives an operation or information inputted from a user equipment. The display device 1330 includes a screen such as an LCD or OLED display, and displays an image of the navigation functions or content that is reproduced. The speaker 1331 outputs sound of the navigation function or the content that is reproduced.

The wireless communication interface 1333 supports any cellular communication scheme (such as LTE and LTE-advanced) and performs wireless communication. The wireless communication interface 1333 may generally include, for example, a BB processor 1334 and an RF circuit 1335. The BB processor 1334 may perform, for example, encoding/decoding, modulation/demodulation, and multiplexing/de-multiplexing, and performs various types of signal processing for wireless communication. In addition, the RF circuit 1335 may include, for example, a frequency mixer, a filter and an amplifier, and transmits and receives a radio signal via the antenna 1337. The wireless communication interface 1333 may also be a chip module on which the BB processor 1334 and the RF circuit 1335 are integrated. The wireless communication interface 1333 may include multiple BB processors 1334 and multiple RF circuits 1335, as shown in FIG. 25. Although FIG. 25 shows an example in which the wireless communication interface 1333 includes multiple BB processors 1334 and multiple RF circuits 1335, the wireless communication interface 1333 may also include a single BB processor 1334 and a single RF circuit 1335.

Furthermore, in addition to a cellular communication scheme, the wireless communication interface 1333 may support another type of wireless communication scheme, such as a short-distance wireless communication scheme, a near field communication scheme, and a wireless LAN scheme. In this case, the wireless communication interface 1333 may include the BB processor 1334 and the RF circuit 1335 for each wireless communication scheme.

Each of the one or more antenna switches 1336 switches a connection destination of the antennas 1337 among multiple circuits (such as circuits for different wireless communication schemes) included in the wireless communication interface 1333.

Each of the one or more antennas 1337 includes a single antenna element or multiple antenna elements (such as multiple antenna elements included in an MIMO antenna), and is used for transmitting and receiving a radio signal by the wireless communication interface 1333. The vehicle navigation device 1320 may include multiple antennas 1337, as shown in FIG. 25. Although FIG. 25 shows an example in which the vehicle navigation device 1320 includes multiple antennas 1337, the vehicle navigation device 1320 may also include a single antenna 1337.

Furthermore, the vehicle navigation device 1320 may include the antenna 1337 for each wireless communication scheme. In this case, the antenna switch 1336 may be omitted from the configuration of the vehicle navigation device 1320.

The battery 1338 supplies power to blocks of the vehicle navigation device 1320 shown in FIG. 25 via feeder lines, which are partially shown as dashed lines in the figure. The battery 1338 accumulates power supplied from the vehicle.

In the system and method according to the present disclosure, it is apparent that components and steps may be decomposed and/or recombined. These decomposition and/or recombination should be considered as equivalents of the present disclosure. Also, the steps of executing the above-described series of processes may naturally be performed in chronological order in the order illustrated, but need not necessarily be performed in chronological order. Some steps may be performed in parallel or independently from each other.

Although the embodiments of the present disclosure have been described above in detail in conjunction with the drawings, it should be understood that the above-described embodiments are merely used to illustrate the present disclosure rather than limit the present disclosure. Those skilled in the art may make various modifications and changes to the above embodiments without departing from the spirit and scope of the present disclosure. Therefore, the scope of the present disclosure is defined merely by the appended claims and their equivalents.

The invention claimed is:

1. An electronic device, comprising
circuitry configured to
detect, on cellular transmission radio resources, a paging signal including an address of the electronic device from a cellular access point(AP),
if the paging signal is detected, keep silent in a predetermined duration,
modulate predetermined information on a first carrier signal transmitted from the cellular AP or other cellular AP for channel estimation, and modulate data collected by the electronic device on a second carrier signal transmitted from the cellular AP or other cellular AP for data transmission, wherein the circuitry is configured to detect energy levels of predetermined symbols received on the cellular transmission radio resources based on a threshold, and map a pattern of the energy levels to the address to detect the paging signal.

2. The electronic device according to claim 1, wherein the circuitry comprises energy detection circuitry, which comprises an antenna, a wave detector, a peak finder, a threshold setting circuit and a comparator, configured to detect the energy levels.

3. The electronic device according to claim 1, wherein the predetermined symbols are OFDM symbols with specific positions in one or more resource blocks.

4. The electronic device according to claim 3, wherein the OFDM symbols are located in a legacy channel by puncturing on the legacy channel.

5. The electronic device according to claim 4, wherein the legacy channel is PDSCH.

6. The electronic device according to claim 1, wherein the circuitry is further configured to wake up from a sleeping mode in response to a predetermined condition, the predetermined condition is that a predetermined amount of data is collected by the electronic device.

7. The electronic device according to claim 1, wherein the predetermined information is a predetermined preamble.

8. The electronic device according to claim 1, further comprising a predetermined number of antennas, configured to feedback the modulated predetermined information on the first carrier signal one by one for channel estimation on each of the antennas.

9. The electronic device according to claim 8, wherein the predetermined number of antennas are configured to feedback the modulated data simultaneously.

10. The electronic device according to claim 1, wherein the circuitry is configured to sleep after the modulated data is feedback.

11. A communication method for an electronic device, comprising
   detecting, on cellular transmission radio resources, a paging signal including an address of the electronic device from a cellular access point(AP),
   if the paging signal is detected, keeping silent in a predetermined duration,
   modulating predetermined information on a first carrier signal transmitted from the cellular AP or other cellular AP for channel estimation, and
   modulating data collected by the electronic device on a second carrier signal transmitted from the cellular AP or other cellular AP for data transmission,
   wherein the method further comprises detecting energy levels of predetermined symbols received on the cellular transmission radio resources based on a threshold, and mapping a pattern of the energy levels to the address to detect the paging signal.

12. The method according to claim 11, wherein the predetermined symbols are OFDM symbols with specific positions in one or more resource blocks.

13. The method according to claim 12, wherein the OFDM symbols are located in a legacy channel by puncturing on the legacy channel.

14. The method according to claim 11, wherein the predetermined information is a predetermined preamble.

15. The method according to claim 11, further comprising feeding back the modulated predetermined information on the first carrier signal one by one for channel estimation on each of a predetermined number of antennas.

16. The method according to claim 15, further comprising feeding back the modulated data simultaneously with the predetermined number of antennas.

17. The method according to claim 11, further comprising switching to a sleeping mode after the modulated data is feedback.

18. A non-transitory computer readable medium comprising computer readable instructions that, when executed by at least one processor of an electronic device, cause the at least one processor to: detect, on cellular transmission radio resources, a paging signal including an address of the electronic device from a cellular access point (AP), if the paging signal is detected, keep silent in a predetermined duration, modulate predetermined information on a first carrier signal transmitted from the cellular AP or other cellular AP for channel estimation, and modulate collected data on a second carrier signal transmitted from the cellular AP or other cellular AP for data transmission, wherein the instructions further cause the at least one processor to detect energy levels of predetermined symbols received on the cellular transmission radio resources based on a threshold, and map a pattern of the energy levels to the address to detect the paging signal.

* * * * *